(12) United States Patent
Suetsugu et al.

(10) Patent No.: US 8,573,042 B2
(45) Date of Patent: Nov. 5, 2013

(54) METHOD AND DEVICE FOR MEASURING OUTPUT CHARACTERISTIC OF AIR FUEL RATIO DETECTING MODULE

(75) Inventors: Hajime Suetsugu, Higashihiroshima (JP); Makoto Matsumae, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 268 days.

(21) Appl. No.: 12/944,528

(22) Filed: Nov. 11, 2010

(65) Prior Publication Data

US 2011/0113871 A1 May 19, 2011

(30) Foreign Application Priority Data

Nov. 13, 2009 (JP) .................................. 2009-260359
Feb. 17, 2010 (JP) .................................. 2010-032534

(51) Int. Cl.
*G01M 15/10* (2006.01)
(52) U.S. Cl.
USPC ....................................................... 73/114.72
(58) Field of Classification Search
USPC ................... 73/23.31, 23.32, 114.69, 114.71, 73/114.72
See application file for complete search history.

(56) References Cited

U.S. PATENT DOCUMENTS

| 6,739,177 B2* | 5/2004 | Sato et al. ..................... 73/23.31 |
| 8,015,967 B2* | 9/2011 | Morita et al. ................. 123/674 |
| 8,249,793 B2* | 8/2012 | Miyashita et al. ............ 701/103 |
| 2003/0110845 A1* | 6/2003 | Kumagai et al. ............... 73/116 |
| 2007/0125350 A1* | 6/2007 | Morita et al. ................. 123/679 |
| 2008/0147297 A1* | 6/2008 | Nakagawa et al. ........... 701/103 |
| 2009/0118987 A1* | 5/2009 | Morita et al. ................. 701/106 |
| 2010/0077729 A1* | 4/2010 | Endo .............................. 60/276 |
| 2012/0004834 A1* | 1/2012 | Serra et al. ................... 701/104 |

FOREIGN PATENT DOCUMENTS

JP 2008-121533 A 5/2008

\* cited by examiner

*Primary Examiner* — Eric S McCall
(74) *Attorney, Agent, or Firm* — Alleman Hall McCoy Russell & Tuttle LLP

(57) ABSTRACT

This disclosure provides a method for measuring an output characteristic of an air fuel ratio sensor based on an output value of the air fuel ratio sensor at the time of changing a fuel injection amount. Under a predetermined condition, an increase in the fuel injection amount is started from a particular cylinder and the increase in the fuel injection amount is continued for a given time period, or a decrease in the fuel injection amount is started from the particular cylinder and the decrease in the fuel injection amount is continued for the given time period. Therefore, the output characteristic of the air fuel ratio detecting module can be measured with sufficient accuracy, regardless of the contacting strength of emission gas for every cylinder against the air fuel ratio detecting module.

12 Claims, 20 Drawing Sheets

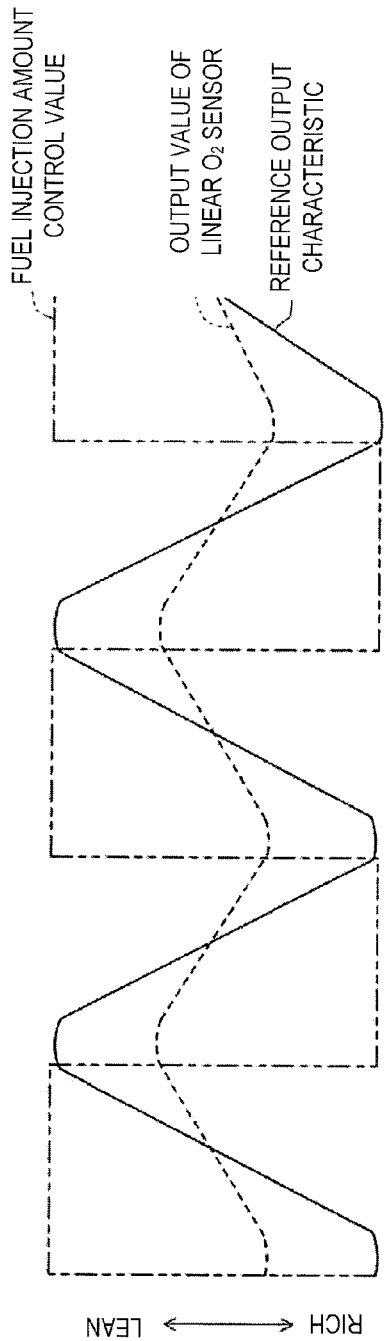
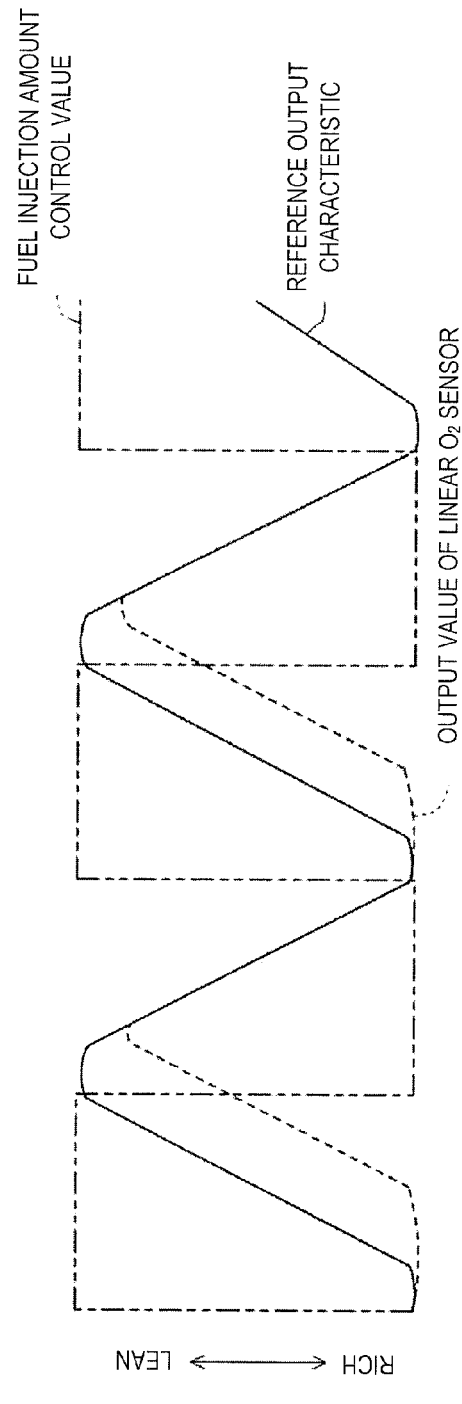
FIG. 8A
FIG. 8B

METHOD AND DEVICE FOR MEASURING OUTPUT CHARACTERISTIC OF AIR FUEL RATIO DETECTING MODULE

BACKGROUND

The present invention relates to a method and device for measuring an output characteristic of an air fuel ratio detecting module (e.g., an air fuel ratio sensor) based on an output value of the air fuel ratio detecting module at the time of changing a fuel injection amount.

Conventionally, in order to raise a purification rate of harmful components in exhaust gas by a catalyst provided in the exhaust passage, an air fuel ratio feedback control for correcting a feedback correction amount is known in the art. This control performs the correction so that the air fuel ratio of exhaust gas becomes the theoretical air fuel ratio, based on the output of an air fuel ratio sensor for detecting the air fuel ratio of the exhaust gas.

In many cases, an air fuel ratio control system for performing such an air fuel ratio feedback control is provided with an abnormality determination function. This function determines that the air fuel ratio of any of the cylinders is abnormal when it is hard to bring the air fuel ratio of the exhaust gas close to theoretical air fuel ratio by the correction of the feedback correction amount (for example, when a cylinder-to-cylinder gap of the air fuel ratio of the air fuel mixture is caused).

For example, JP2008-121533A discloses a control device of an internal combustion engine. In this control device, an air fuel ratio sensor is provided in an engine exhaust passage, and an air fuel ratio of an air fuel mixture supplied to each cylinder is controlled based on an output signal of the air fuel ratio sensor. A sensor signal rate-of-change integration means calculates a rate of change of the air fuel ratio sensor signal at a given time interval, and integrates absolute values of the rates of change. The control device determines whether the air fuel ratio of any cylinder is abnormal based on the rate-of-change integrated value of the air fuel ratio sensor signals.

In the meantime, the output value of the air fuel ratio sensor needs to be appropriately secured as the premise for performing a high-precision abnormality determination. However, it is known in the art that a variation will be caused in the output value of the air fuel ratio sensor as the sensor is degraded (time-varying individual specificity), and the variation will also be caused in the output value due to the mechanical individual specificity of the sensor product.

In this regard, JP2008-121533A requires the abnormality of the air fuel ratio sensor not being detected by a self-diagnostic function when performing the abnormality diagnosis of the air fuel ratio of any of the cylinders. However, as described above, because any positive measures are not taken against the mechanical individual specificity or the time-varying individual specificity of the air fuel ratio sensor, there is a problem that the abnormality diagnosis may not be performed when there is a variation in the output value, which is caused by the individual specificities of the air fuel ratio sensor.

In order to solve such a problem, it can be considered that the output value of the air fuel ratio sensor is corrected according to the mechanical individual specificity and the time-varying individual specificity of the air fuel ratio sensor to detect the cylinder-to-cylinder gap abnormality of the air fuel ratio. However, it is necessary to appropriately grasp the mechanical individual specificity and the time-varying individual specificity of the air fuel ratio sensor, as the premise.

For this reason, it can be considered that, for example, the output characteristic of the air fuel ratio sensor is measured, while intentionally changing the fuel injection amount, and the individual specificities of the air fuel ratio sensor are grasped based on the measurement results. However, if the air fuel ratio sensor used is provided to an exhaust gas collecting part, a contacting strength of the emission gas for every cylinder against the air fuel ratio sensor may vary to some extent due to the spatial relationships of the exhaust passages connected with the respective cylinders and the air fuel ratio sensor, and thereby causing a new problem of giving a certain influence on the measurement results.

SUMMARY

The present invention is made in view of the above situations to provide a method and device for measuring an output characteristic of an air fuel ratio detecting module based on an output value of the air fuel ratio detecting module at the time of changing a fuel injection amount. This technique measures the output characteristic of the air fuel ratio detecting module with sufficient accuracy, regardless of a contacting strength of emission gas for every cylinder against the air fuel ratio detecting module, as well as regardless of the shape of an exhaust gas collecting part.

In order to achieve the above objective, the present invention is based on starting the change of the fuel injection amount always from a particular cylinder (i.e., always from the same cylinder).

According to one aspect of the invention, a method of measuring an output characteristic of an air fuel ratio detecting module is provided. The air fuel ratio detecting module is provided to an exhaust gas collecting part and outputs a value related to an oxygen concentration in exhaust gas. The measuring is based on an output value of the air fuel ratio detecting module at the time of changing a fuel injection amount. The method includes performing at least one of the following under a predetermined condition: starting an increase in the fuel injection amount from a particular cylinder, and continuing the increase in the fuel injection amount for a given time period; and starting a decrease in the fuel injection amount from the particular cylinder, and continuing the decrease in the fuel injection amount for the given time period.

Because the increase or the decrease in the fuel injection amount is always started from the particular cylinder when changing the fuel injection amount, measurement errors resulting from that the cylinder from which the change in the fuel injection amount is started varies can be suppressed. Therefore, the output characteristic of the air fuel ratio detecting module can be measured with sufficient accuracy regardless of a contacting strength of emission gas for every cylinder against the air fuel ratio detecting module, that is, regardless of the shape of the exhaust gas collecting part.

In one embodiment, when measuring the output characteristic of the air fuel ratio detecting module, the measurement of the output characteristic may be started at an exhaust timing of the particular cylinder.

Normally, a certain amount of time (dead time) is required for detecting the change in the air fuel ratio of exhaust gas by the air fuel ratio detecting module after the fuel injection amount is changed. Such a dead time is caused when the following delay variations are accumulated: a delay variation after a control command for the fuel injection amount is outputted until the fuel injection amount is actually changed; a delay variation until exhaust gas is discharged from the cylinder for which the fuel injection amount is changed; a delay variation until exhaust gas fills the exhaust gas collecting part; a delay variation until exhaust gas reaches an element of the air fuel ratio detecting module, etc.

For this reason, when changing the fuel injection amount, the measurement of the output characteristic is started from the particular cylinder from which the increase or the decrease in the fuel injection amount is always started, as well as the measurement of the output characteristic is started at the exhaust timing of the particular cylinder. Thus, because at least the delay variation after the control command of the fuel injection amount is outputted until the exhaust gas is discharged from the particular cylinder is eliminated, the output characteristic of the air fuel ratio detecting module can be measured with more accuracy.

In one embodiment, the exhaust timing may be an open timing of an exhaust valve.

Because the measurement of the output characteristic is started at the open timing of the exhaust valve, the output characteristic of the air fuel ratio detecting module can be measured with sufficient accuracy, for example, even when the exhaust valve opens at the termination period of expansion stroke (i.e., even when exhaust gas is discharged before exhaust stroke from the termination period of the expansion stroke).

In one embodiment, the given time period may be a time period during which a fuel injection process is performed for an integral multiple times of the total number of cylinders.

Note that the term "fuel injection process" as used herein refers to a fuel injection during one combustion cycle of each cylinder, and this includes a package injection as well as divided injections, as one fuel injection process.

The given time period is a period during which the fuel injection process is performed for the integral multiple times of the total number of cylinders. Therefore, for example, when repeating the increase and the decrease in the fuel amount, because the measurement is always started from the particular cylinder (always from the same cylinder) for both the increasing and the decreasing, measurement errors resulting from the cylinder from which the change in the fuel injection amount is started varies can be suppressed.

In one embodiment, the method may further include calculating a correction value for correcting the output value of the air fuel ratio detecting module based on the output characteristic of the air fuel ratio detecting module.

Even when an appropriate output value is not outputted due to the individual specificity of the air fuel ratio detecting module, the appropriate output value of the air fuel ratio detecting module can be acquired by correcting the detected output value of the air fuel ratio detecting module by using the correction value calculated under the predetermined condition.

In one embodiment, the method may further include correcting the output value of the air fuel ratio detecting module based on the correction value, and detecting a cylinder-to-cylinder gap abnormality of the air fuel ratio of supplied air fuel mixture based on the corrected output value of the air fuel ratio detecting module.

Even when the appropriate output value is not outputted due to the individual specificity of the air fuel ratio detecting module, the cylinder-to-cylinder gap abnormality of the air fuel ratio can be detected with sufficient accuracy by correcting the detected output value of the air fuel ratio detecting module.

In one embodiment, the correction value may be calculated based on a difference between a median of a variation in the output characteristic of the air fuel ratio detecting module caused by a mechanical individual specificity of the air fuel ratio detecting module, which is set in advance, and the measured output characteristic.

Because the air fuel ratio detecting module having an extremely long dead time or a low response is excluded from the air fuel ratio detecting modules (i.e., taking the median of the variation) and the remaining air fuel ratio detecting modules are used as candidates for comparison, reliability of the correction value improves.

In one embodiment, the output characteristic may be related to a dead time and a response.

The term "dead time" as used herein refers to a time it takes to detect the change in the air fuel ratio of the exhaust gas by the air fuel ratio detecting module after the air fuel ratio of the air fuel mixture is changed. Moreover, the term "response" as used herein refers to a rate of change in the air fuel ratio detected after the air fuel ratio detecting module detects the change in the air fuel ratio of the exhaust gas.

Therefore, it becomes possible to calculate an appropriate correction value reflecting the dead time and the response of the air fuel ratio detecting module, and to appropriately correct the output value of the air fuel ratio detecting module.

According to another aspect of the invention, a method of measuring an output characteristic of an air fuel ratio detecting module is provided. The air fuel ratio detecting module is provided to an exhaust gas collecting part and outputs a value related to an oxygen concentration in exhaust gas. The measuring is based on an output value of the air fuel ratio detecting module at the time of changing a fuel injection amount. The method includes starting the measurement of the output characteristic of the air fuel ratio detecting module at an exhaust timing of a cylinder for which a fuel injection amount is changed.

Because the measurement of the output characteristic of the air fuel ratio detecting module is started at the exhaust timing of the cylinder for which the fuel injection amount is changed, at least a delay variation after a control command of the fuel injection amount is inputted until the fuel injection amount is actually changed, and a delay variation until exhaust gas is discharged from the cylinder for which the fuel injection amount is changed, can be eliminated. Thereby, the output characteristic of the air fuel ratio detecting module can be measured with sufficient accuracy.

In one embodiment, when measuring the output characteristic of the air fuel ratio detecting module, under a predetermined condition, the change in the fuel injection amount may be started from a particular cylinder, and the measurement of the output characteristic may be started at the exhaust timing of the particular cylinder.

When changing the fuel injection amount, the measurement of the output characteristic is started from the particular cylinder from which the increase or the decrease in the fuel injection amount is always started, and the measurement of the output characteristic is started from the exhaust timing of the particular cylinder. Thereby, the output characteristic of the air fuel ratio detecting module can be measured with more accuracy.

In one embodiment, the exhaust timing may be an open timing of an exhaust valve.

Because the measurement of the output characteristic is started at the open timing of the exhaust valve, for example, even when the exhaust valve opens at the termination period of expansion stroke, the output characteristic of the air fuel ratio detecting module can be measured with sufficient accuracy.

According to another aspect of the invention, an output characteristic measuring device is provided, which includes an air fuel ratio detecting module provided to an exhaust gas collecting part and for outputting a value related to an oxygen concentration in exhaust gas, a fuel injection valve controlling module for controlling a fuel injection valve, and a module for measuring an output characteristic of the air fuel ratio detecting module based on the output value of the air fuel ratio detecting module at the time of changing the fuel injection amount. The fuel injection valve controlling module performs at least one of the following under a predetermined condition: starting an increase in the fuel injection amount from a particular cylinder and continuing the increase in the fuel injection amount for a given time period, and starting a decrease in the fuel injection amount from the particular cylinder and continuing the decrease in the fuel injection amount for the given time period.

Therefore, similar effects to the above method of measuring the output characteristic of the air fuel ratio detecting module can be acquired.

According to another aspect of the invention, an output characteristic measuring device is provided, which includes an air fuel ratio detecting module provided to an exhaust gas collecting part and for outputting a value related to an oxygen concentration in exhaust gas, a fuel injection valve controlling module for controlling a fuel injection valve, and a module for measuring an output characteristic of the air fuel ratio detecting module based on the output value of the air fuel ratio detecting module at the time of changing the fuel injection amount. When measuring the output characteristic of the air fuel ratio detecting module, the measurement of the output characteristic is started at an exhaust timing of a cylinder for which the fuel injection amount is changed first by the fuel injection valve controlling module.

Therefore, similar effects to the above method of measuring the output characteristic of the air fuel ratio detecting module can be acquired.

BRIEF DESCRIPTION OF THE DRAWINGS

FIGS. 8A and 8B are graphs schematically showing a relation between a measured output characteristic of the linear $O_2$ sensor and a reference characteristic, where FIG. 8A shows a case where a measured response is smaller than a reference response, and FIG. 8B shows a case where a measured dead time is longer than a reference dead time.

DESCRIPTION OF THE EMBODIMENT

Hereinafter, several embodiments of the present invention are described in detail with reference to the appended drawings.

Embodiment 1

Figure 1:
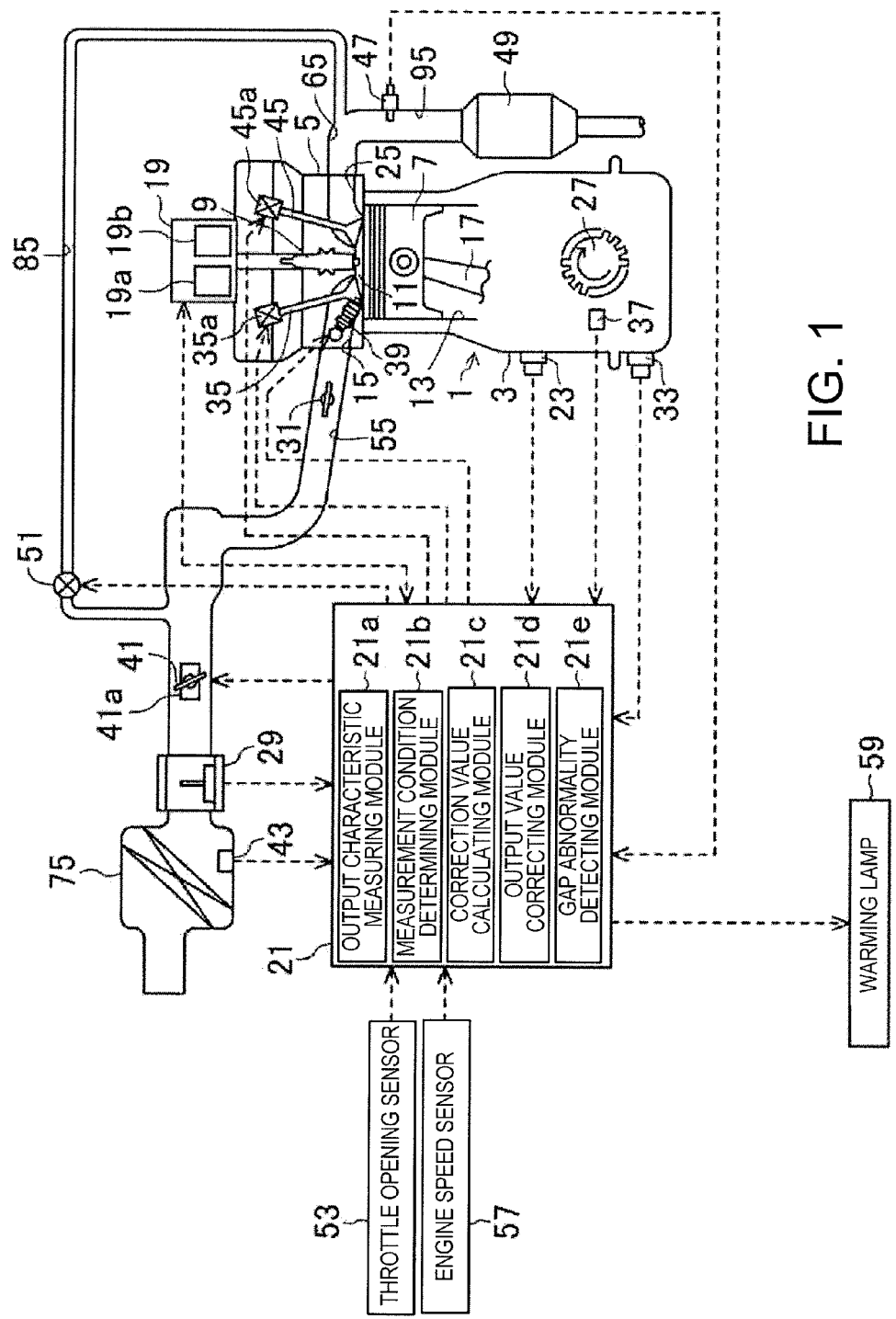
FIG. 1 is a schematic diagram of a control system of an engine according to one embodiment of the present invention.

FIG. 1 is a schematic diagram of an engine control system according to one embodiment of the present invention. The engine 1 is an in-line, four-cylinder, jump-spark-ignition type direct injection gasoline engine, and each cylinder includes a cylinder block 3 and a cylinder head 5 fixed to an upper part of the cylinder block 3. Reciprocatable pistons 7 are fitted into cylinders 13 of the cylinder block 3, respectively. Each combustion chamber 11, which is surrounded by a top face of the piston 7, an inner wall surface of the cylinder 13, and a pentroof-shaped bottom face of the cylinder head 5, is formed above the corresponding piston 7. A crankshaft (not shown) is arranged in a crankcase below the pistons 7, and it is connected with the pistons 7 with respective connecting rods 17.

Inside the crankcase, a crank angle sensor 37 for detecting a rotation angle of the crankshaft (crank angle) is provided. The crank angle sensor 37 has an electromagnetic pickup coil for outputting a signal to a PCM (Power-train Control Module) 21 at a timing corresponding a rotation of a rotor 27 attached to an end of the crankshaft so as to integrally rotate with the crankshaft. Specifically, the signal is outputted as the rotation passes a convex part formed on the peripheral of the rotor 27.

In addition, an engine coolant temperature sensor 23 for detecting a temperature of coolant which flows inside of water jackets (not shown), and an engine oil temperature sensor 33 for detecting a temperature of engine oil, are provided to the cylinder block 3.

Two or more spark plugs 9 are provided to the cylinder head 5, corresponding to the respective cylinders 13. A tip electrode of each spark plug 9 is located inside the corresponding combustion chamber 11. The spark plugs 9 are connected with respective ignition circuits 19 provided to an upper part of the cylinder head 5. In the example of FIG. 1, the ignition circuits 19 are provided corresponding to the number of the spark plugs 9; however, the number of the ignition circuits 19 may be more or less than the number of the spark plugs 9.

The ignition circuit 19 corresponding to each cylinder 13 energizes an ignition coil (non-illustrated) while receiving a control signal for carrying out an ignition electric discharge of the spark plug 9 from the PCM 21. Then, after a predetermined energization time has lapsed, if the control signal is no longer received, an ignition discharge current is given from a secondary winding of the ignition coil to cause the spark plug 9 to carry out the ignition electric discharge.

The ignition circuit 19 is provided with a capacitor 19a which is charged by the ignition electric discharge of the spark plug 9, and an ion current detecting circuit 19b for detecting the current flowing due to the capacitor 19a discharging the charged electrical charge as ion current. The ignition circuit 19 outputs a detection signal of the ion current detected by the ion current detecting circuit 19b to the PCM 21.

Two intake ports 15 and two exhaust ports 25 which communicate with each combustion chamber 11 are formed in the cylinder head 5. Intake and exhaust valves (two intake valves 35 and two exhaust valves 45) which open and close independently at predetermined timings by electromagnetic VVTs (Variable Valve Timing mechanisms) 35a and 45a are arranged in the port openings of the inlet ports 15 and the exhaust ports 25.

The open and close timings of the intake valves 35 and the exhaust valves 45 can be changed by the electromagnetic VVTs 35a and 45a toward the advancing side and the retarding side. Thereby, an overlapping period changes to vary an amount of combusted gas which remains inside the combustion chamber 11.

In each cylinder, an intake passage 55 is arranged so as to communicate with the inlet ports 15, and an exhaust passage 65 is arranged so as to communicate with the exhaust ports 25. The intake passage 55 and the exhaust passage 65 are connected with each other via an EGR passage 85 so that a part of the exhaust gas inside the exhaust passage 65 flows back to the intake passage 55 by an electric EGR valve 51 which is provided in the EGR passage 85 and can adjust its opening.

In the intake passage 55, from the upstream side, an air cleaner 75, an intake air temperature sensor 43, an airflow sensor 29 for detecting a flow rate of intake air, a throttle valve 41 for choking the intake passage 55 by being driven by an electric motor 41a, a TSCV (Tumble Swirl Control Valve) 31 for adjusting a strength of the intake air flow movement inside the combustion chamber 11, and an injector 39 (fuel injection valve) for gasoline injection, which directly injects and supplies supplied gasoline into each combustion chamber 11, are arranged.

Figure 2:
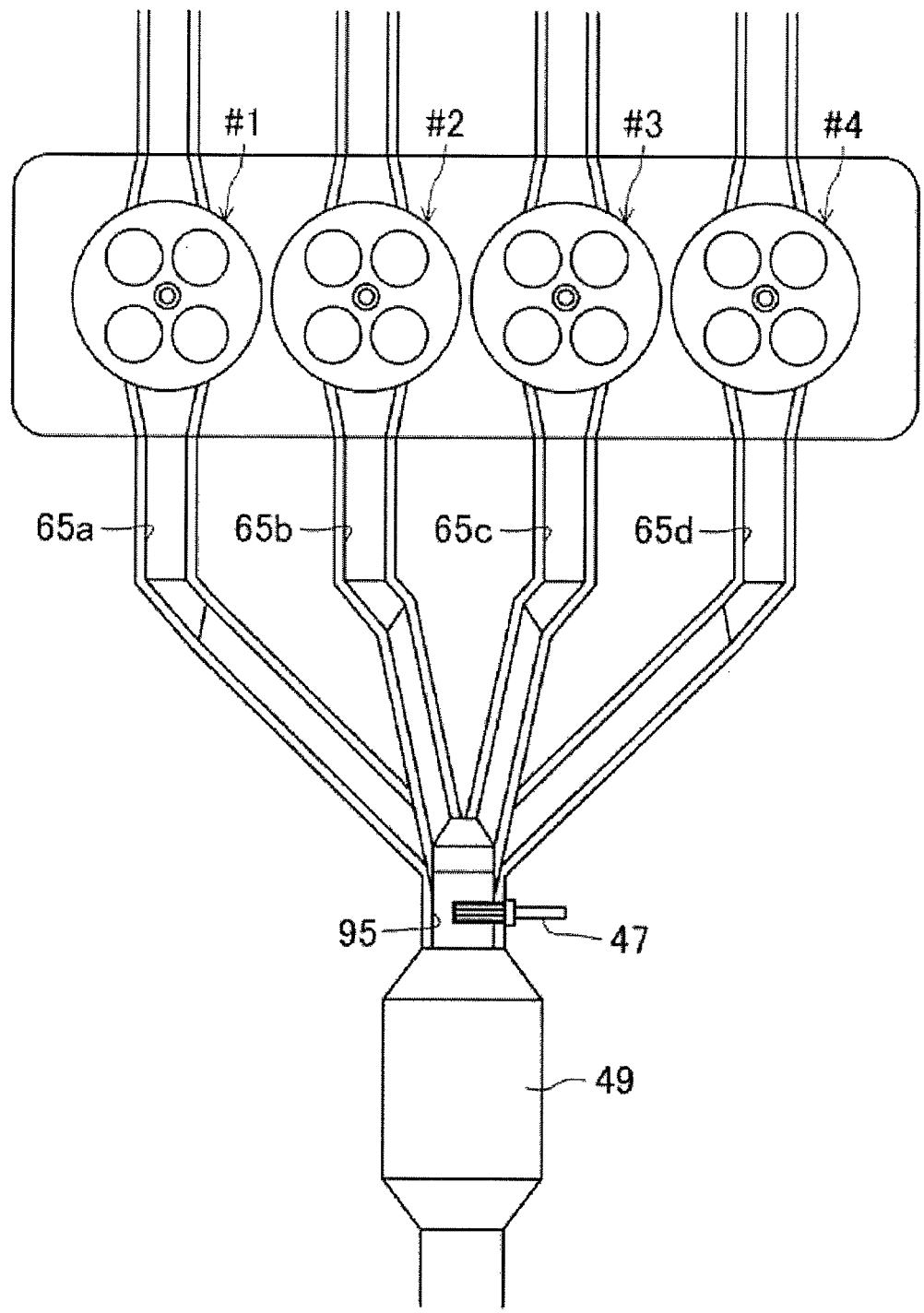
FIG. 2 is a view schematically showing a relation between each cylinder and an exhaust gas collecting part.

As shown in FIG. 2, in an exhaust gas collecting part 95 (exhaust manifold collecting part) of the exhaust passage 65, where the exhaust passages 65a, 65b, 65c and 65d from the four cylinders #1, #2, #3 and #4 gather, a linear $O_2$ sensor 47 (an example of an air fuel ratio detecting module) for detecting an air fuel ratio of air fuel mixture based on an oxygen concentration in exhaust gas, and a catalytic converter 49 for purifying the exhaust gas, are arranged. Note that, as the catalytic converter 49, a three-way catalyst which can simultaneously purify three components of HC, CO, and NOx may be used.

It is well known that the PCM 21 is provided with a CPU, a ROM, a RAM, an I/O interface circuit, etc. In the PCM 21, as signals required for the control according to this embodiment, at least, in addition to output signals of the crank angle sensor 37, the engine coolant temperature sensor 23, the airflow sensor 29, and the linear $O_2$ sensor 47, output signals of a throttle opening sensor 53 for detecting a throttle opening, and an engine speed sensor 57 for detecting an engine speed, are inputted. Then, the PCM 21 performs a feedback control of the engine 1, a measurement of the output characteristic of the linear $O_2$ sensor 47, and a cylinder-to-cylinder gap abnormality detection control of an air fuel ratio, based on the output signals of these sensors.

Figure 3:
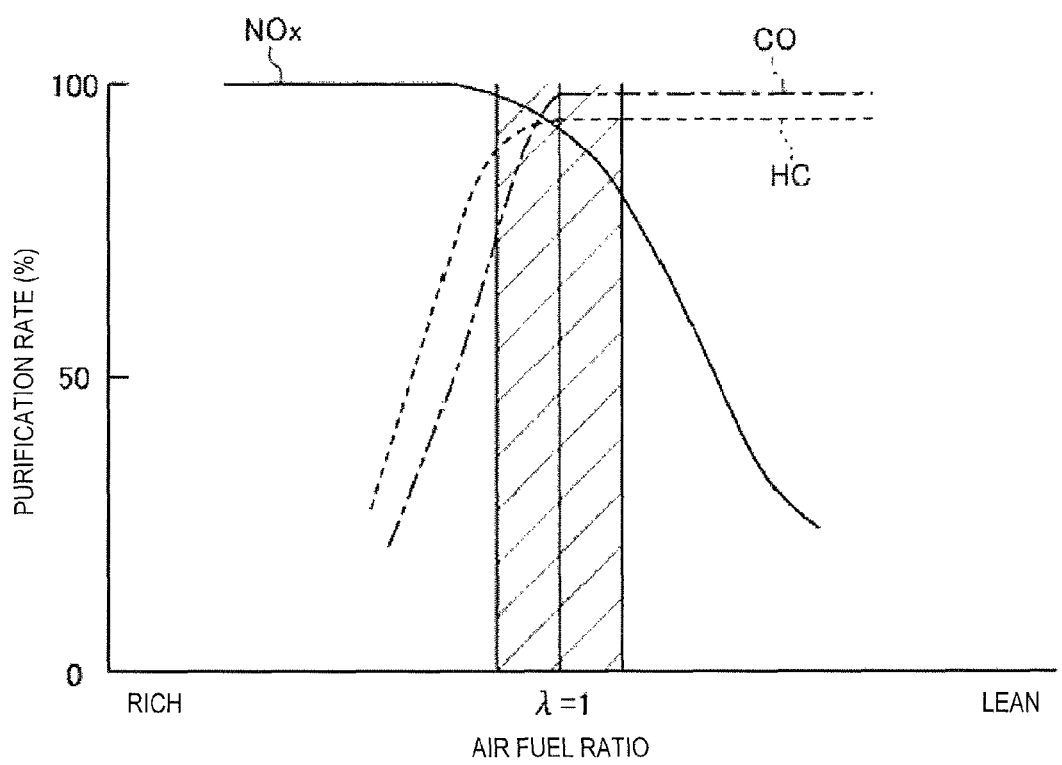
FIG. 3 is a graph schematically showing a purification rate of a three-way catalyst with respect to an air fuel ratio.

FIG. 3 is a graph schematically showing a purification rate (%) of the catalyst with respect to the air fuel ratio, where the air fuel ratio becomes richer as it goes to the left along the horizontal axis, and the purification rate by the catalyst increases as it goes upward along the vertical axis. As shown in FIG. 3, if the air fuel ratio becomes richer, HC, CO and the like are not purified sufficiently and tends to be discharged as they are, and if the air fuel ratio becomes leaner, the conversion capability of the catalyst is lost and $NO_2$ increases.

For this reason, the PCM 21 detects, so that an actual air fuel ratio of the engine 1 converges within a predetermined target air fuel ratio range which is centering on the theoretical air fuel ratio based on the detection value of the linear $O_2$ sensor 47, a rich state or a lean state of the oxygen concentration in the exhaust gas. The PCM 21 then precisely performs the feedback control of the fuel injection amount from the injector 39 which is set based on an intake air amount. Note that the target air fuel ratio range has an upper limit which is about 0.25 richer than the theoretical air fuel ratio state and a lower limit which is about 0.25 leaner than the theoretical air fuel ratio state.

By performing such a feedback control, a high purification rate can be attained for any of CO, HC, and NOx which are contained in the exhaust gas. However, if the cylinder-to-cylinder gap abnormality of the air fuel ratio of the supplied air fuel mixture arises, and, in other words, for example, if the other three cylinders are normal but only one cylinder is lean because of lack of the fuel injection amount, the following problems may arise.

That is, the gas discharged from each cylinder independently flows into the catalytic converter 49, respectively. Therefore, for example, if the gas discharged from the cylinder which is in the lean state into the catalytic converter 49, the conversion capability of the catalyst may be lost and $NO_2$ may be discharged to the outside. On the other hand, if the gas discharged from the cylinder which is in the rich state flows into the catalytic converter 49, HC, CO and the like are not purified and discharged as they are.

Therefore, the PCM 21 detects the cylinder-to-cylinder gap abnormality of the air fuel ratio of the supplied air fuel mixture based on the output value of the linear $O_2$ sensor 47. Specifically, while the engine is in operation, a difference value which is a rate of change of an excess air ratio $\lambda$ of the linear $O_2$ sensor 47 (=output value/theoretical air fuel ratio) is calculated at an interval of a predetermined crank angle (for example, a crank angle synchronized with an ignition), and the absolute values of the difference values are integrated. Then, the PCM 21 determines whether the gap abnormality occurred based on whether the integrated value of the difference values of the excess air ratio $\lambda$ during a given time period exceeds a predetermined determination value.

In the meantime, an appropriate output characteristic of the linear $O_2$ sensor 47 needs to be secured as the premise for performing a high-precision abnormality determination. However, it is known in the art that there is a variation in the output characteristic depending on a mechanical individual specificity of the linear $O_2$ sensor 47 (i.e., depending on the product, which may be referred to herein as "product variation"), or a variation in the output characteristic depending on a time-varying individual specificity (i.e., depending on a degree of degradation of the sensor). For this reason, depending on the variation of the output characteristic of the linear O₂ sensor 47, if the cylinder-to-cylinder gap of the air fuel ratio is very small (falls within the target air fuel ratio range of FIG. 3), the PCM 21 may possibly determine it to be abnormal or, conversely, if the cylinder-to-cylinder gap of the air fuel ratio is large (falls within the target air fuel ratio range of FIG. 3), the PCM 21 may possibly determine it not to be abnormal.

For this reason, whenever the engine 1 starts, the PCM 21 measures the output characteristic of the linear O₂ sensor 47, and compares the measured output characteristic with a reference characteristic set in advance. The PCM 21 then calculates an output correction value CV1 for correcting the output of the linear O₂ sensor 47 according to the individual specificity (including the mechanical individual specificity and/or the time-varying individual specificity) of the linear O₂ sensor 47.

Specifically, the PCM 21 includes an output characteristic measuring module 21a for measuring the output characteristic of the linear O₂ sensor 47, and a measurement condition determining module 21b. When the measurement condition determining module 21b determines that a first predetermined condition is satisfied, the output characteristic measuring module 21a repeatedly increases or decreases the fuel injection amount intentionally for a predetermined number of times, and measures values related to a dead time and a response of the linear O₂ sensor 47 at that time. The term "dead time" as used herein refers to a time required from the correction of the air fuel ratio of the air fuel mixture to the detection of the change in the air fuel ratio of the exhaust gas by the linear O₂ sensor 47. The term "response" as used herein refers to a rate of change in the air fuel ratio which is detected after the linear O₂ sensor 47 detects the change in the air fuel ratio of the exhaust gas.

Here, the first predetermined condition is a condition to exclude a case where the influence on an engine speed Ne is large (the influence on a vehicle's traveling performance is large) if the air fuel ratio is fluctuated (increasing or decreasing the fuel injection amount). Therefore, the measurement condition determining module 21b determines that the first predetermined condition is satisfied, for example, in a state where an engine warm-up operation is finished (that is, a state where a coolant temperature Tw is above a given temperature), and in a state where each variation of the engine speed Ne, an air intake filling efficiency and a throttle opening Th is small (below a predetermined value), and these values are stable. On the other hand, the measurement condition determining module 21b does not determine that the first predetermined condition is satisfied, for example, if the engine speed is in a low speed range like in idling.

When measuring the output characteristic of the linear O₂ sensor 47 for two or more times (for example, when performing a varying control for decreasing the fuel injection amount after increasing the fuel amount, for five times (the predetermined number of times)), it is not necessary to perform the varying control consecutively for five times. If each varying control (from the start of increasing the fuel amount to the end of decreasing the fuel amount) is performed under the first predetermined condition, the measurement may be performed intermittently.

Thus, by intentionally changing the fuel injection amount and measuring the output characteristic of the linear O₂ sensor 47, even when an appropriate output value is not outputted due to the individual specificity of the linear O₂ sensor 47, the correction value for correcting the output of the linear O₂ sensor 47 can be calculated. However, in fact, when measuring the output characteristic of the linear O₂ sensor 47, contacting strengths of the emission gas for every cylinder against the linear O₂ sensor 47 may vary according to the spatial relationship between the exhaust passages 65a, 65b, 65c, and 65d connected with the respective cylinders #1, #2, #3 and #4, and the linear O₂ sensor 47, thereby affecting the measurement results.

Figure 4:
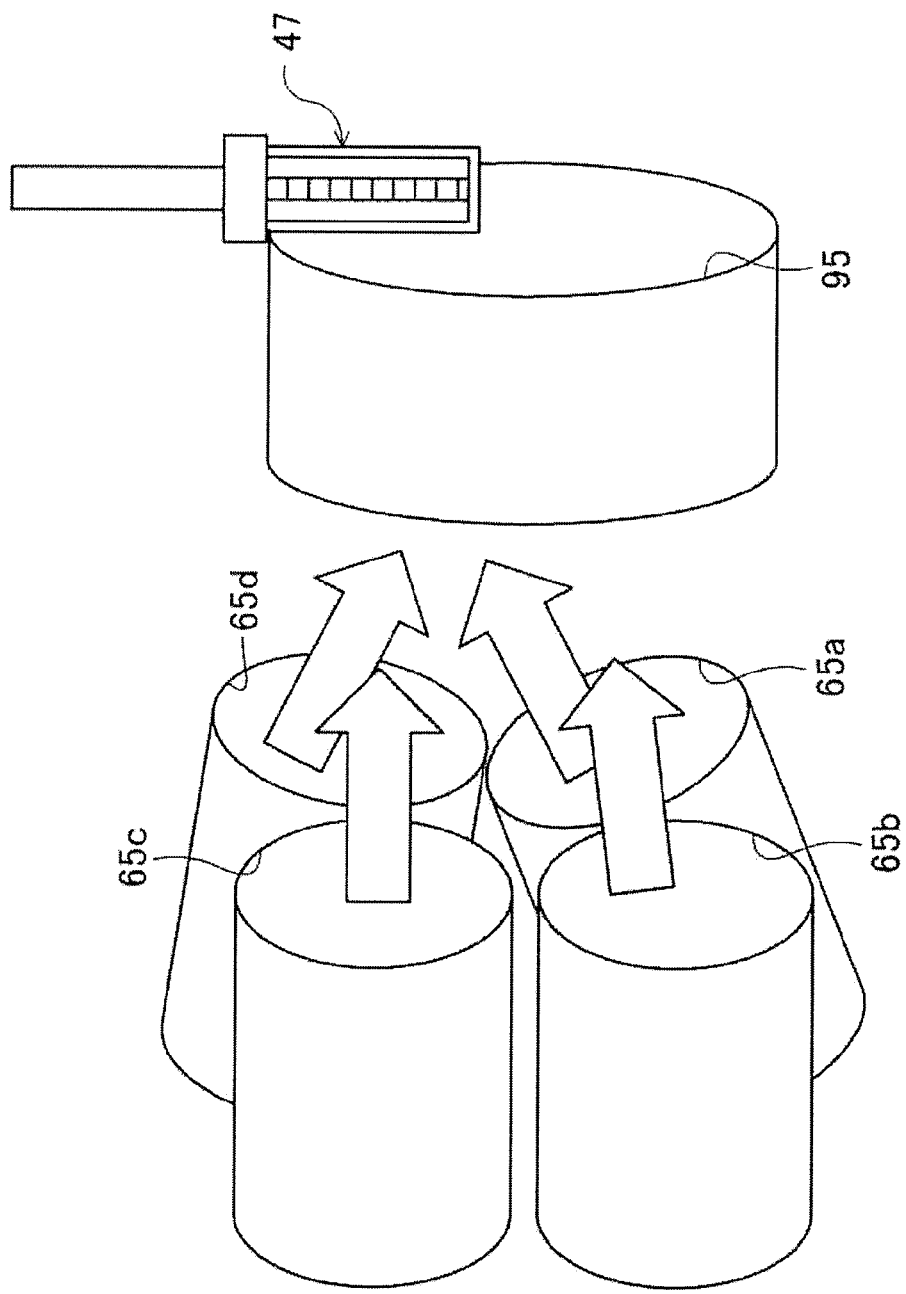
FIG. 4 is a perspective view schematically showing a spatial relationship between exhaust passages connected with respective cylinders and a linear $O_2$ sensor.

That is, in the example of this embodiment, as shown in FIG. 2, the exhaust passages 65a, 65b, 65c and 65d which communicate with the respective cylinders #1, #2, #3 and #4 are bundled by the exhaust gas collecting part 95 in a state where two of them are stacked on the other two to be a two stage pile. As shown in FIG. 4, directions of the exhaust gas flowing into the exhaust gas collecting part 95 from the respective exhaust passages 65a, 65b, 65c, and 65d differ from each other (directions of the white arrows in FIG. 4). For this reason, it is very difficult to make the gas contact against the linear O₂ sensor 47 uniformly and, thus, there exist cylinders with a strong gas contact against the linear O₂ sensor 47 and cylinders with a weak gas contact against the linear O₂ sensor 47.

Figure 5:
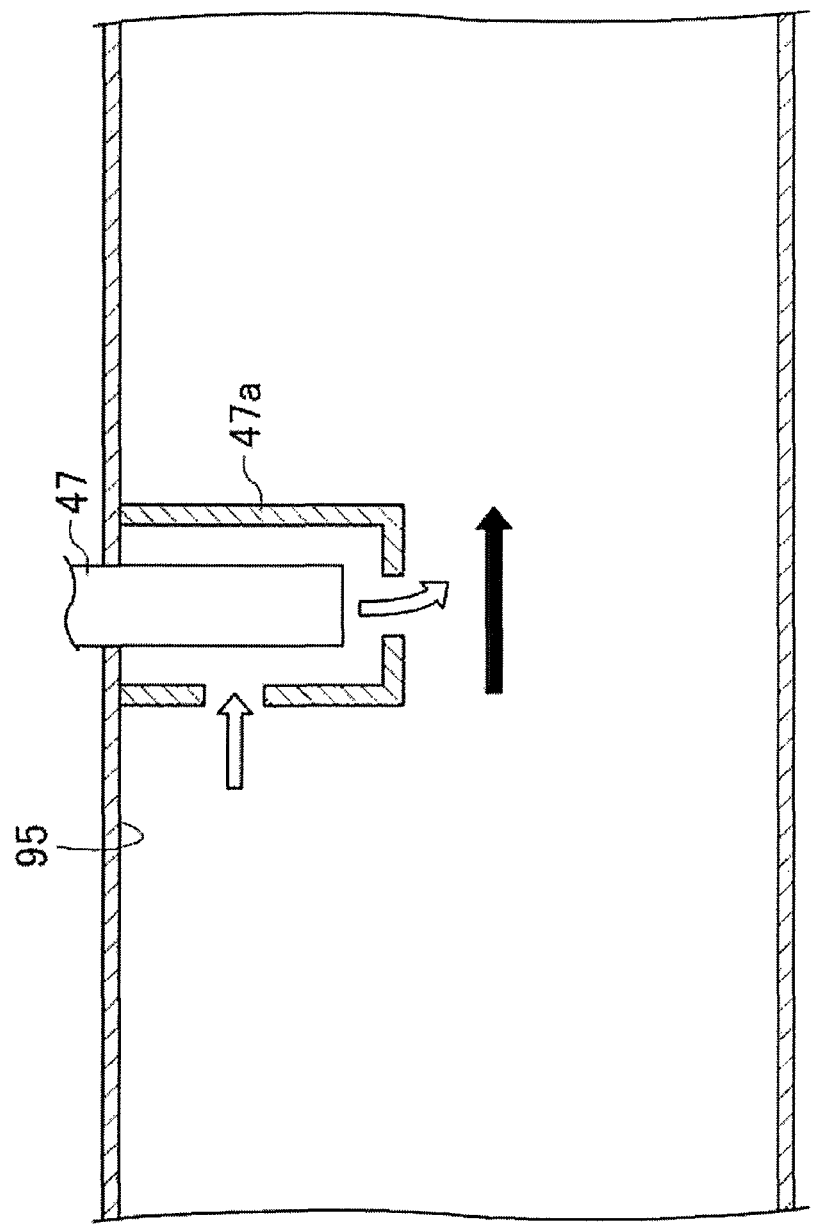
FIG. 5 is a view schematically illustrating a flow of exhaust gas flowing through an exhaust gas collecting part.

Further, an element of the linear O₂ sensor 47 may get wet with the moisture generated by combustion of the air fuel mixture. Therefore, a thermal stress over the element becomes uneven and causes distortion therein, resulting in a crack in the element. For this reason, as shown in FIG. 5, a protective cover 47a is often provided to cover the element. Such a protective cover 47a is formed with a hole through which exhaust gas is introduced, and the linear O₂ sensor 47 detects an oxygen concentration in the exhaust gas introduced from the hole in the white arrow direction. Then, the exhaust gas inside the protective cover 47a is discharged from the protective cover 47a by a pressure difference between the inside and the outside of the protective cover 47a, which is produced by a negative pressure of the exhaust gas flowing through a tip area of the protective cover 47a in the black arrow direction.

As described above, when detecting the air fuel ratio of the gas discharged from two or more cylinders by the single linear O₂ sensor 47 provided to the exhaust gas collecting part 95, the sensor tends to sensitively detect the oxygen concentration for the exhaust gas contacting strongly against the sensor. Therefore, the sensor output value differs for every cylinder. For this reason, the sensor measures as if the dead time becomes shorter when an increase in the fuel injection amount is started from a strong gas-contact cylinder; and, on the contrary, the sensor measures as if the dead time becomes longer when the increase in the fuel injection amount is started from a weak gas-contact cylinder. Thus, a measurement error may occur depending on which cylinder the increase or the decrease in the fuel injection amount is started.

Therefore, the output characteristic measuring module 21a, under a predetermined condition, starts the increase in the fuel injection amount from a particular cylinder (the same cylinder) and then continues the increase in the fuel injection amount for a given time period, or starts the decrease in the fuel injection amount from the particular cylinder and then continues the decrease in the fuel injection amount for the given time period. The term "given time period" as used herein refers to a time period during which the fuel injection processes are performed for an integral multiple times of the total number of cylinders. The term "fuel injection process" refers to fuel injection during one combustion cycle of each cylinder, where a package injection and divided injections are also counted as the one fuel injection process.

Figure 6A:
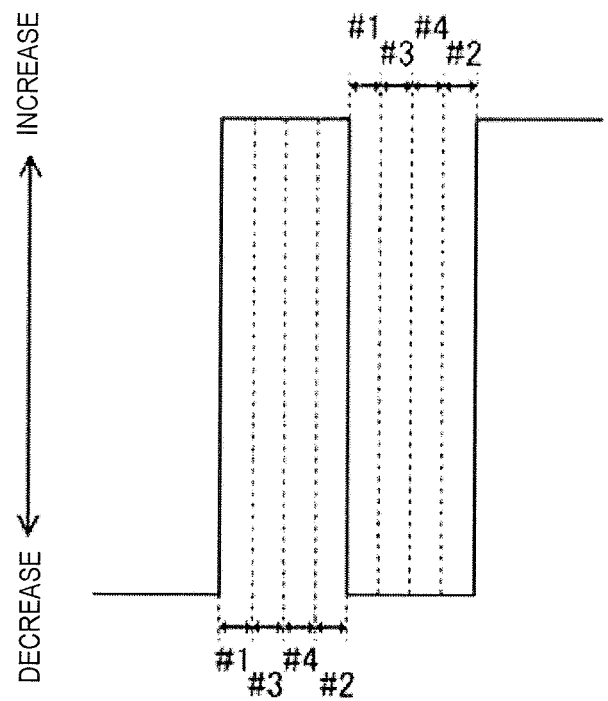
FIGS. 6A and 6B are diagrams schematically showing control patterns of a fuel injection amount control.
Figure 6B:
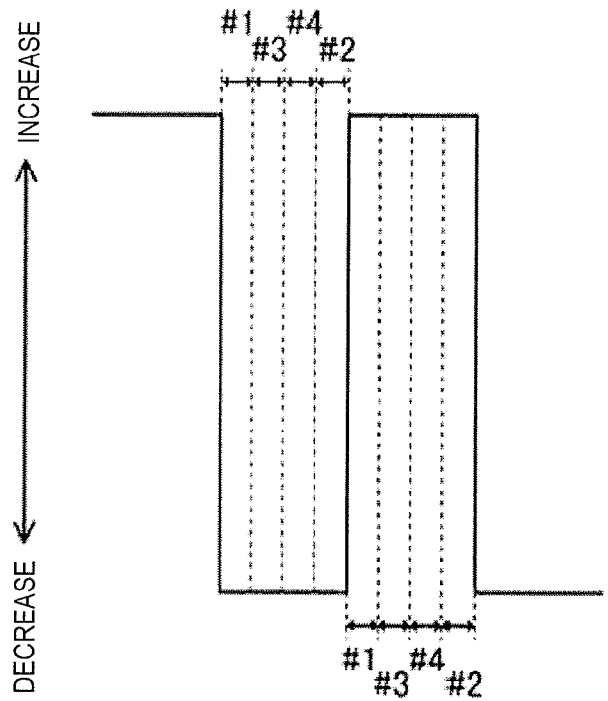

Specifically, if it is determined that the first predetermined condition is satisfied by the measurement condition determining module 21b, the output characteristic measuring module 21a actuates the injector 39. Then, as shown in FIG. 6A, the output characteristic measuring module 21a always starts the increase in the fuel injection amount from the first cylinder #1, and, after that, continues the increase in the fuel injection amount until the fuel injection processes are completed for the integral multiple times of the four cylinders (4, 8 or 12), or, as shown in FIG. 6B, the output characteristic measuring module 21a always starts the decrease in the fuel injection amount from the first cylinder #1, and, after that, continues the decrease in the fuel injection amount for the given time period until the fuel injection processes are completed for the integral multiple times of 4. Note that, in FIGS. 6A and 6B, "#1" indicates the first cylinder fuel injection process, "#2" indicates the second cylinder fuel injection process, "#3" indicates the third cylinder fuel injection process, and "#4" indicates the fourth cylinder fuel injection process. In the example of FIGS. 6A and 6B, the integral multiple is set to four times, and the increase or the decrease in the fuel injection amount is performed alternately for four fuel injection processes, respectively.

Thereby, when changing the fuel injection amount, the increase or the decrease in the fuel injection amount is always started from the first cylinder #1. Therefore, the measurement errors resulting from the starting cylinder of the change in the fuel injection amount differing each time can be suppressed. Further, since the fuel injection process is performed by the integral multiple times of the total number of cylinders, when repeating the increase and the decrease in the fuel amount, the measurement is always started from the first cylinder #1 for both the increasing and decreasing. Note that the output characteristic measuring module 21a constitutes a fuel injection valve controlling module in the claims. In the example of FIGS. 6A and 6B, the increasing amount (or the decreasing amount) of the fuel injection in the fuel injection process for each cylinder is made the same. However, the increasing amount (or the decreasing amount) of the fuel injection in the fuel injection process may be changed for each cylinder, for example.

The PCM 21 further includes a correction value calculating module 21c for comparing the dead time and the response which are measured, with the reference characteristic (reference dead time and reference response) set in advance, and calculating an output correction value CV1 for correcting an output value OV1 of the linear $O_2$ sensor 47 according to the mechanical individual specificity and/or the time-varying individual specificity of the linear $O_2$ sensor 47. Here, the reference characteristic is set based on the median of the variation in the output characteristic of the linear $O_2$ sensor 47 caused by the mechanical individual specificity of the linear $O_2$ sensor 47. Herein, a linear $O_2$ sensor which does not have a time-varying individual specificity (i.e., a brand-new linear $O_2$ sensor) is used as a sample product, for example. The dead time and the response when the increase or decrease of the fuel injection amount is performed for every sample are measured, and, these medians are set as the reference dead time and the reference response, respectively.

Figure 7:
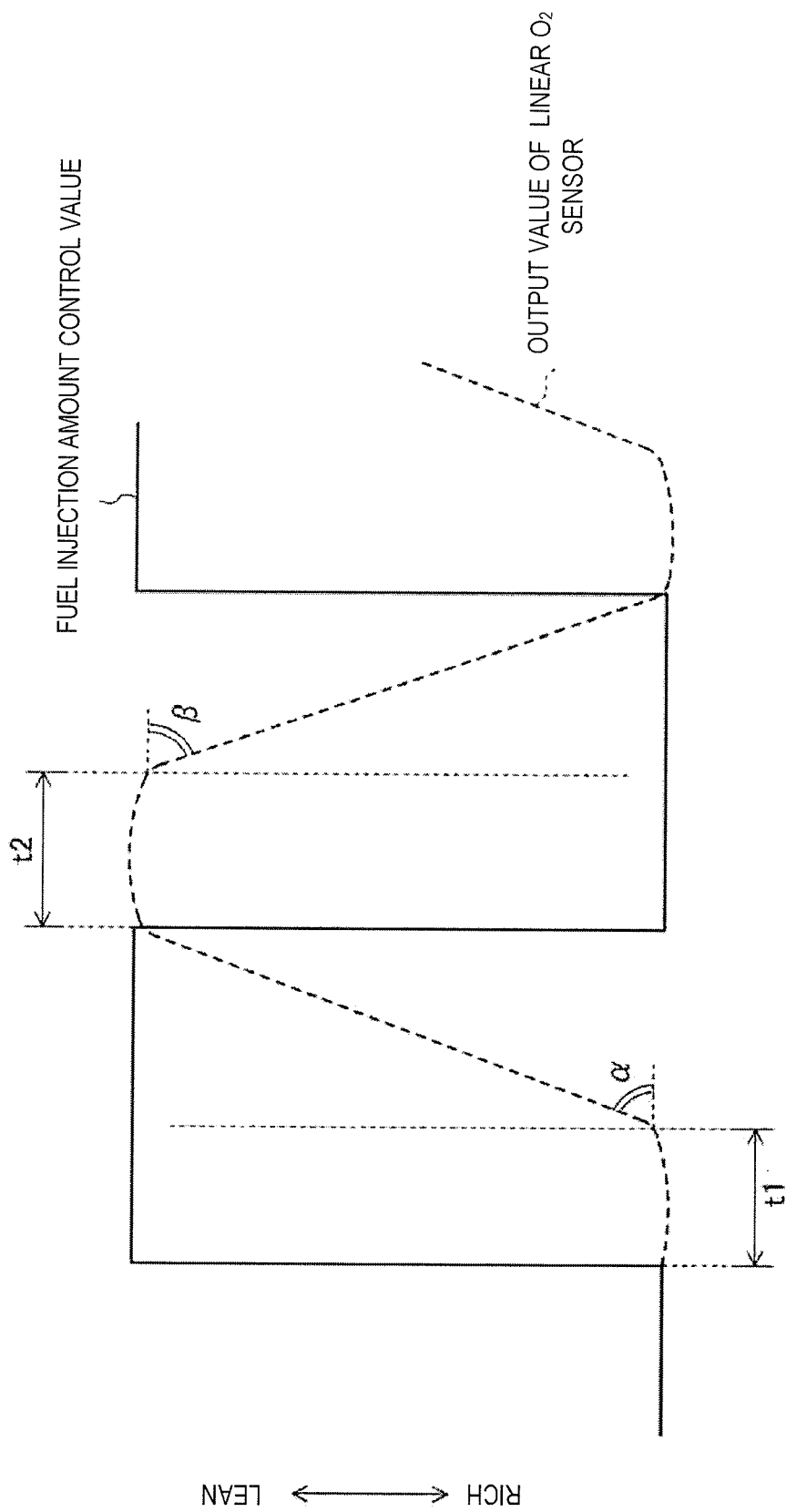
FIG. 7 is a graph schematically showing a relation between a fuel injection amount control value and a linear $O_2$ sensor output value.

FIG. 7 is a graph schematically showing a relation between a fuel injection amount control value and the output value of the linear $O_2$ sensor. In this figure, "t1" indicates a dead time from rich to lean, "t2" indicates a dead time from lean to rich, "α" indicates a response from rich to lean, and β indicates a response from lean to rich. As shown in FIG. 7, the linear $O_2$ sensor 47 takes the time t1 to detect a change from rich to lean of the air fuel ratio by decreasing the fuel injection amount, and then, it detects α as the rate of change in the air fuel ratio from rich to lean. Similarly, the linear $O_2$ sensor 47 takes the time t2 to detect a change from lean to rich of the air fuel ratio by increasing the fuel injection amount, and then, it detects β as the rate of change in the air fuel ratio from lean to rich.

FIGS. 8A and 8B are graphs schematically showing relations between the output characteristic and the reference characteristic of the linear $O_2$ sensor which are measured. FIG. 8A shows a case where the measured response is smaller than the reference response, and FIG. 8B shows a case where the measured dead time is longer than the reference dead time. As shown in FIGS. 8A and 8B, it can be seen that the output value becomes small when the response of the linear $O_2$ sensor 47 is smaller than the reference response (the inclination is small), and the output value becomes small when a one-way dead time (dead time from rich to lean) of the linear $O_2$ sensor 47 is longer than the reference dead time.

Figure 9:
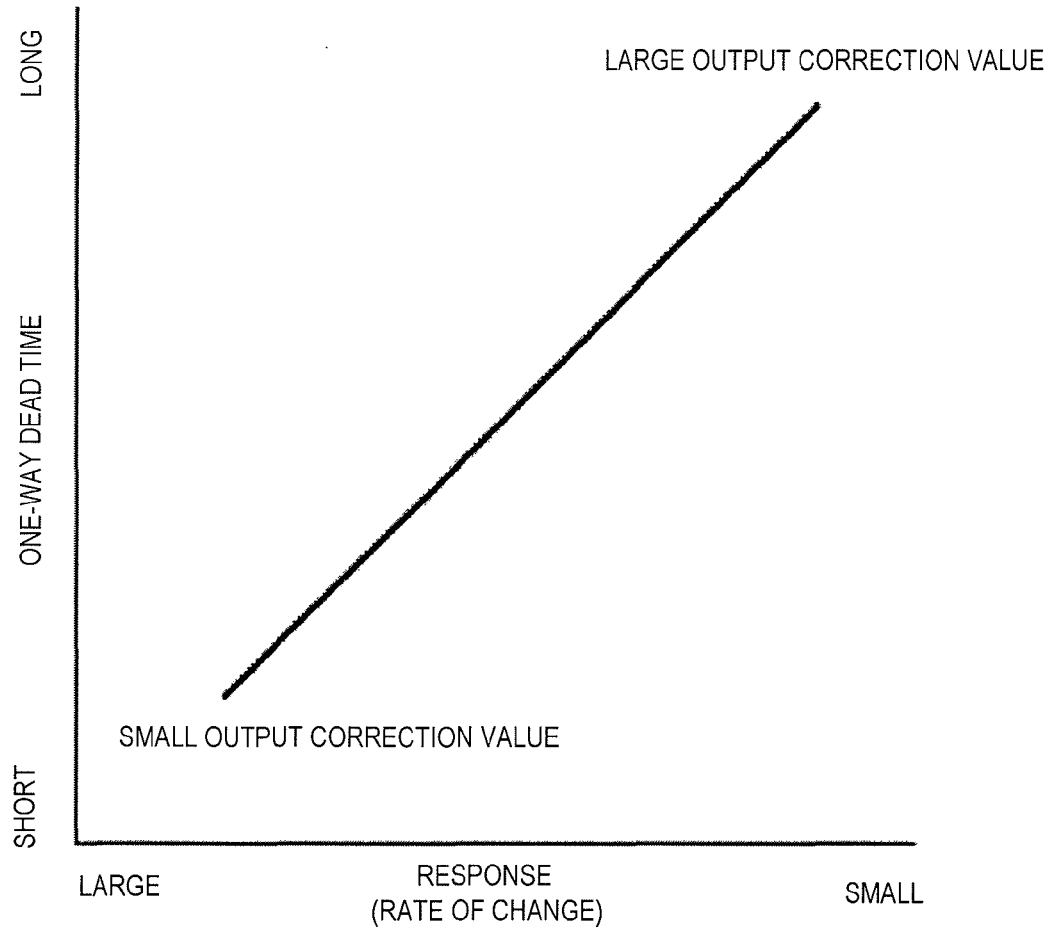
FIG. 9 is a graph schematically showing a relation of an output correction value with respect to the response of the linear $O_2$ sensor and the one-way dead time.

For this reason, the output correction value CV1 calculated by the correction value calculating module 21c is set to a value so that the output value of the linear $O_2$ sensor 47 is increased when the measured output characteristic is smaller as compared with the reference characteristic, and is set to a value so that the output value of the linear $O_2$ sensor 47 is decreased when the measured output characteristic is larger as compared with the reference characteristic. In other words, as shown in FIG. 9, if the measured response (rate of change) is smaller than the reference response and the measured dead time is longer than the reference dead time, the correction value calculating module 21c calculates the output correction value CV1 so that the output value of the linear $O_2$ sensor 47 is increased. On the other hand, if the measured response (rate of change) is larger than the reference response and the measured dead time is shorter than the reference dead time, the correction value calculating module 21c calculates the output correction value CV1 so that the output value of the linear $O_2$ sensor 47 is decreased. More specifically, in this embodiment, the output correction value CV1 (a diagnosis correction value CV2, described later in detail) is multiplied to correct the output value of the linear $O_2$ sensor 47. Therefore, if the measured output characteristic is smaller as compared with the reference characteristic, the correction value calculating module 21c calculates a value equal to or greater than 1 as the output correction value CV1. On the other hand, if the measured output characteristic is larger as compared with the reference characteristic, the correction value calculating module 21c calculates a value less than 1 as the output correction value CV1. Thus, the output correction value CV1 calculated by the correction value calculating module 21c is inputted to an output value correcting module 21d provided in the PCM 21.

The output value correcting module 21d corrects the output value OV1 of the linear $O_2$ sensor 47 under the second predetermined condition. Specifically, if the measurement condition determining module 21b determines that the second predetermined condition is satisfied, the output value correcting module 21d measures the output value OV1 of the linear $O_2$ sensor 47, and corrects the measured output value OV1 (by the diagnosis correction value CV2) based on the output correction value CV1 calculated by the correction value calculating module 21c.

Note that the second predetermined condition checks whether the output correction value CV1 is calculated by the correction value calculating module 21c, and excludes the state where the output value of the linear $O_2$ sensor 47 is hard to secure. Therefore, after the output correction value CV1 is calculated by the correction value calculating module 21c, for example, in a state which often occurs when the vehicle travels (for example, a middle-speed and high-load state), the measurement condition determining module 21b determines that the second predetermined condition is satisfied. On the other hand, if the output correction value CV1 is not calculated by the correction value calculating module 21c or, for example, in a low speed range like at the time of idling, the measurement condition determining module 21b does not determine that the second predetermined condition is satisfied.

The output value correcting module 21d corrects the output value OV1 of the linear $O_2$ sensor 47 based on the output correction value CV1 calculated by the correction value calculating module 21c as described above. However, if the load and the engine speed when calculating the output correction value CV1 deviate excessively from the load and the engine speed when detecting the output value OV1 of the linear $O_2$ sensor 47, which are to be corrected based on the output correction value CV1, it may be difficult to detect the cylinder-to-cylinder gap abnormality in the air fuel ratio with sufficient accuracy.

In more detail, a space from the cylinder to the linear $O_2$ sensor 47 provided to the exhaust gas collecting part 95 has a constant volume. Therefore, a time it takes the exhaust gas to reach the linear $O_2$ sensor 47 after being discharged from each cylinder depends on the speed of the exhaust gas filling the space or, for example, depending on the exhaust gas flow rate. In other words, a time it takes the exhaust gas to be detectable by the linear $O_2$ sensor 47 after being discharged from the cylinder is shorter as the exhaust gas flow rate becomes lower. Therefore, if the exhaust gas flow rate is high, the output characteristic of the linear $O_2$ sensor 47 is measured as if it is improved as compared with the case where the exhaust gas flow rate is low.

Figure 10:
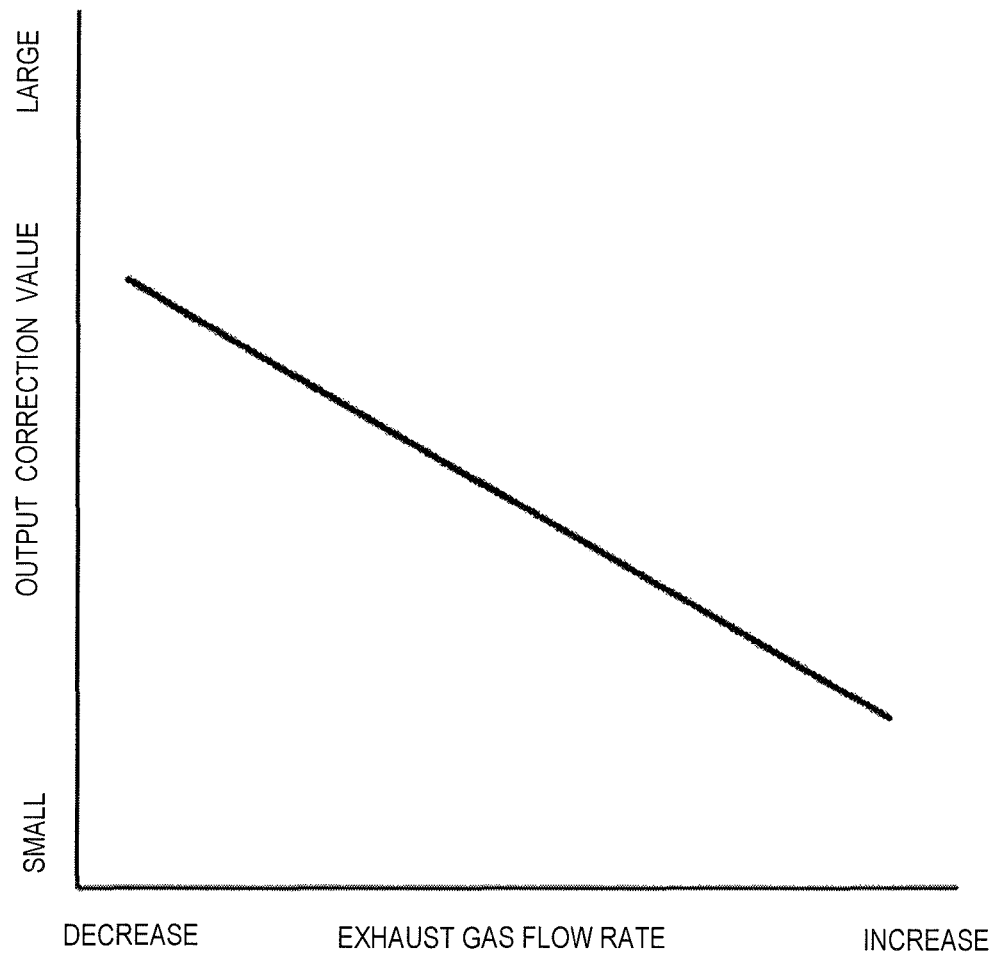
FIG. 10 is a graph schematically showing a relation between the output correction value and an exhaust gas flow rate.

For this reason, as shown in FIG. 10, the output value correcting module 21d corrects the output correction value CV1 so that the output correction value CV1 is larger as the exhaust gas flow rate when correcting the output value OV1 of the linear $O_2$ sensor 47 (a value related to the exhaust gas flow rate) decreases rather than the exhaust gas flow rate when measuring the output characteristic of the linear $O_2$ sensor 47 (a value related to the exhaust gas flow rate). On the other hand, the output value correcting module 21d corrects the output correction value CV1 so that the output correction value CV1 is smaller as it increases rather than the exhaust gas flow rate when measuring the output characteristic of the linear $O_2$ sensor 47 (a value related to the exhaust gas flow rate).

Note that, if $\lambda=1$, since the exhaust gas flow rate can be determined by the sum of the fuel amount and the intake air flow rate, the intake air flow rate detected by the airflow sensor 29 can be used as the value related to the exhaust gas flow rate.

When the engine speed is increased, the time required for the linear $O_2$ sensor 47 to detect the change of the air fuel ratio is not necessarily shortened, but the interval of change becomes short. Therefore, while detecting the air fuel ratio of the exhaust gas discharged from a certain cylinder, it will be influenced by air fuel ratios of exhaust gas discharged from other cylinders. For this reason, when the engine speed is high, the output characteristic of the linear $O_2$ sensor 47 is measured as if it is decreased as compared with the case where the engine speed is low.

Figure 11:
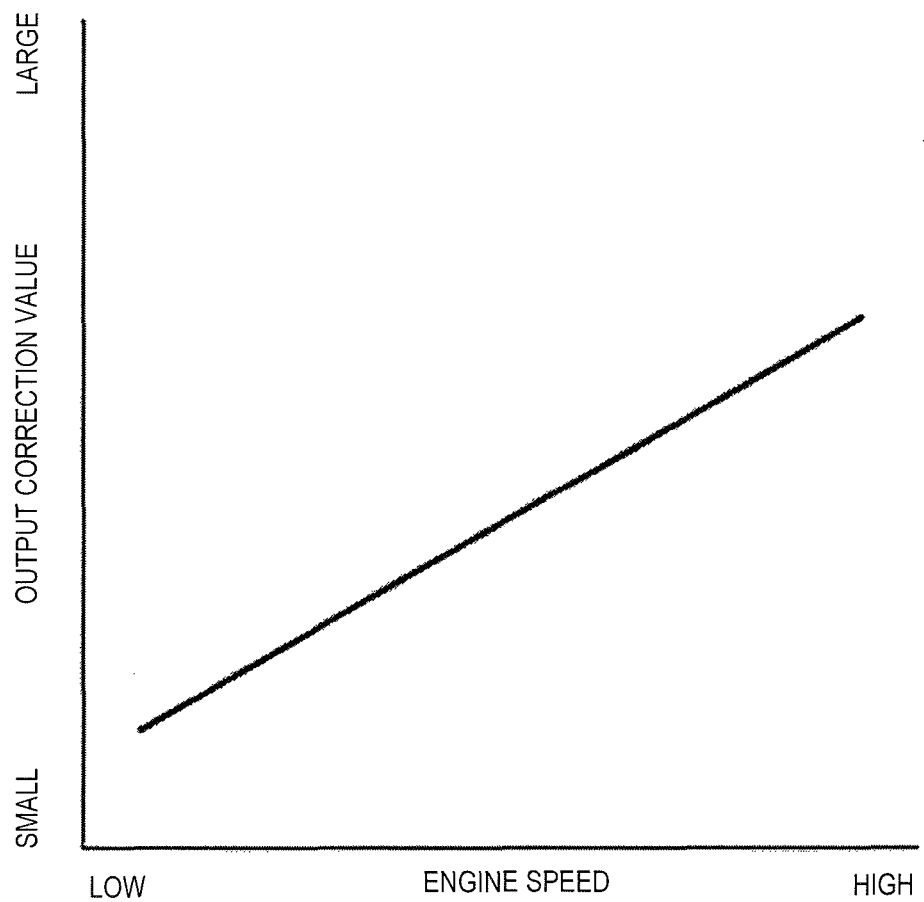
FIG. 11 is a graph schematically showing a relation between the output correction value and an engine speed.

Therefore, as shown in FIG. 11, the output value correcting module 21d corrects the output correction value CV1 so that the output correction value CV1 is smaller as the engine speed when correcting the output value OV1 of the linear $O_2$ sensor 47 decreases rather than the engine speed when measuring the output characteristic of the linear $O_2$ sensor 47. On the other hand, the output value correcting module 21d corrects the output correction value CV1 so that the output correction value CV1 is larger as the engine speed when correcting the output value OV1 of the linear $O_2$ sensor 47 increases rather than the engine speed when measuring the output characteristic of the linear $O_2$ sensor 47.

Then, the output value correcting module 21d corrects the output value OV1 of the linear $O_2$ sensor 47 by using the diagnosis correction value CV2 which is used for correcting the output correction value CV1, according to the difference between the exhaust gas flow rate (or engine speed) when correcting the output value OV1 of the linear $O_2$ sensor 47 and the exhaust gas flow rate (or engine speed) when measuring the output characteristic of the linear $O_2$ sensor 47. Thus, the diagnosis output value OV2 corrected by the output value correcting module 21d is inputted to a gap abnormality detecting module 21e provided in the PCM 21.

The gap abnormality detecting module 21e calculates the excess air ratio $\lambda$(=Output value/theoretical air fuel ratio) using the diagnosis output value OV2 of the linear $O_2$ sensor 47 corrected by the output value correcting module 21d. The gap abnormality detecting module 21e then calculates the difference value which is a rate of change of the excess air ratio $\lambda$, as described above, and integrates absolute values of the difference values. Then, the gap abnormality detecting module 21e determines whether the gap abnormality occurred by determining whether the integrated value of the difference values of the excess air ratios $\lambda$ during a given time period is above the predetermined determination value.

Here, if the air fuel ratios of the supplied air fuel mixture to the cylinders #1 to #4 are normal, the excess air ratio $\lambda$ will be settled near the theoretical air fuel ratio. However, if the air fuel ratio of any of the cylinders becomes abnormal, the air fuel ratios of the exhaust gas will cause a gap between the cylinders and the variation of the excess air ratios $\lambda$ becomes large, thereby the integrated value of the difference values of the excess air ratios $\lambda$ will be large. For this reason, it is possible to determine whether the air fuel ratio of any of the cylinders is abnormal by determining whether the integrated value of the difference values of the excess air ratios $\lambda$ during the given time period is above the predetermined value.

—Processing Operation of Abnormality Detecting Device—
<<Correction Value Calculation Processing>>

Figure 12:
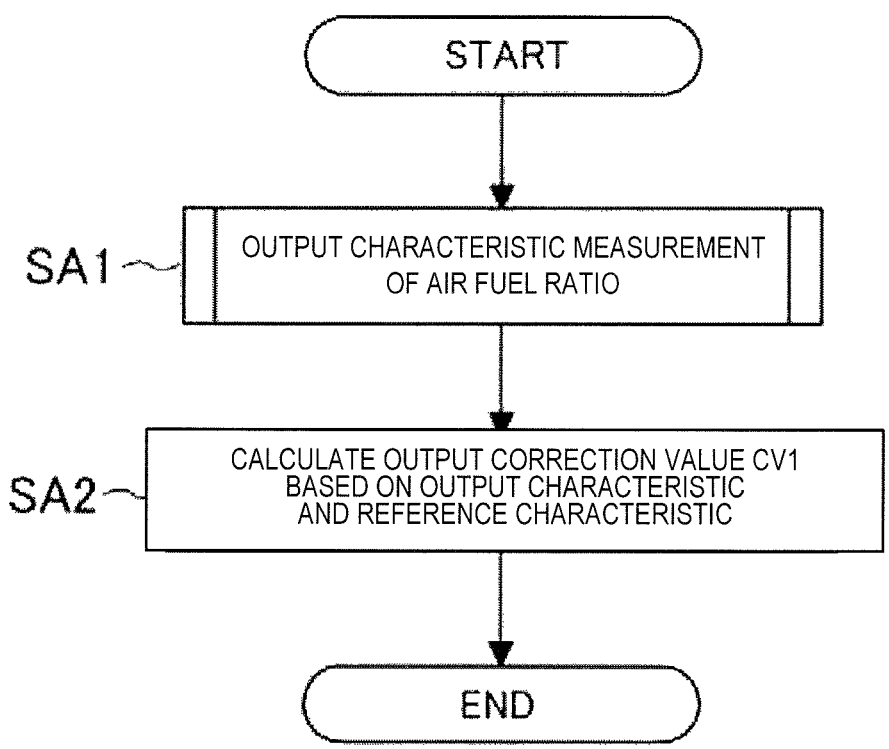
FIG. 12 is a flowchart showing a control of a PCM.

Here, correction value calculating processing at the time of detecting the cylinder-to-cylinder gap abnormality of the air fuel ratio is described with reference to a flowchart shown in FIG. 12.

The routine shown in this flowchart is started by turning on the ignition. First, at step SA1, the routine performs an air fuel ratio output characteristic measurement described later, and, after that, it proceeds to step SA2. At step SA2, the correction value calculating module 21c calculates, based on the dead time and the response of the linear $O_2$ sensor 47 measured by the air fuel ratio output characteristic measurement subroutine, and the reference characteristic (the reference dead time and the reference response) stored in advance, which is set based on the median of the variation in the output characteristic caused by the mechanical individual specificity of the linear $O_2$ sensor 47, the output correction value CV1 for correcting the output value of the linear $O_2$ sensor 47 according to the individual specificity of the linear $O_2$ sensor 47. Specifically, if the measured response (rate of change) is smaller than the reference response and the measured dead time is longer than the reference dead time, the correction value calculating module 21c calculates the output correction value CV1 so that the output value of the linear $O_2$ sensor 47 is increased. On the other hand, if the measured response (rate of change) is larger than the reference response and the measured dead time is shorter than the reference dead time, the correction value calculating module 21c calculates the output correction value CV1 so that the output value of the linear O₂ sensor 47 is decreased. Then, the routine ends.

<<Air Fuel Ratio Output Characteristic Measurement>>

Figure 13:
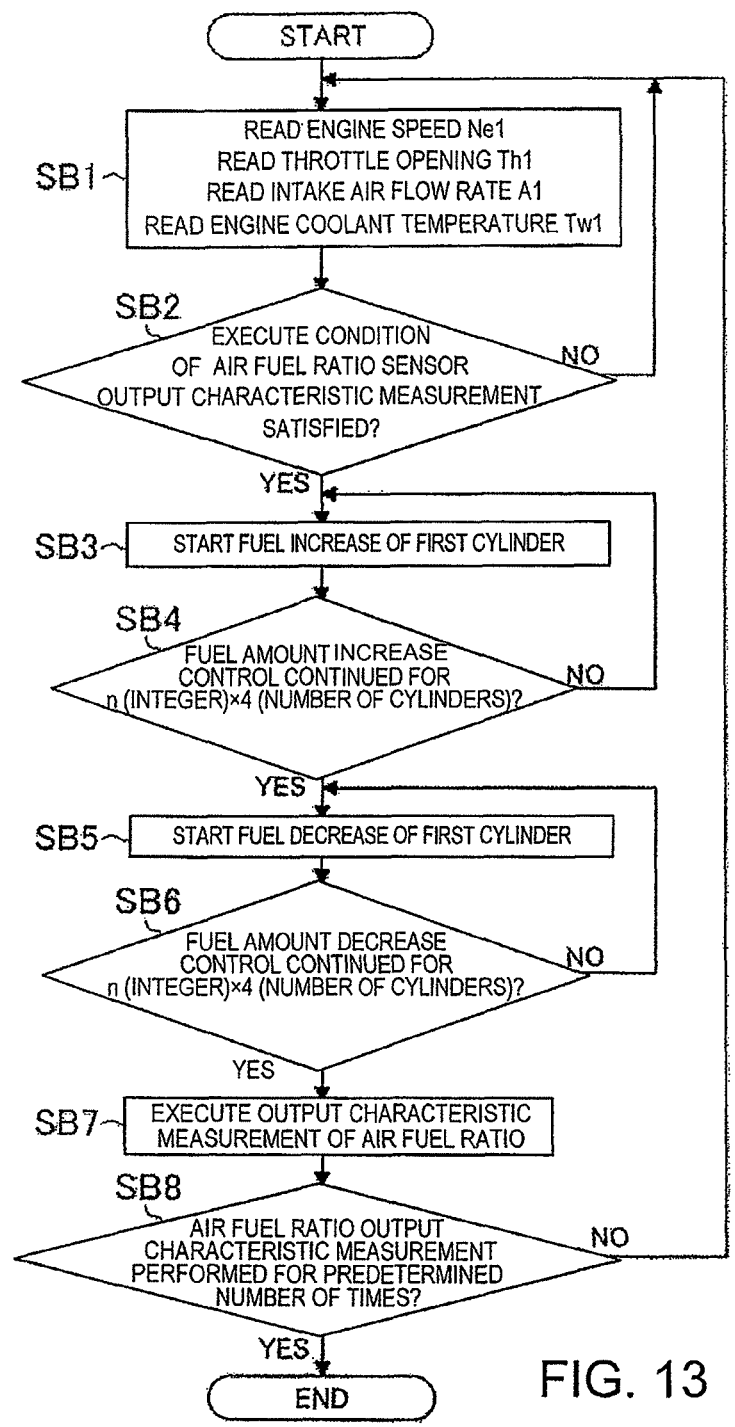
FIG. 13 is a flowchart illustrating a procedure of the control of an air fuel ratio varying control subroutine.

[Next, the air fuel ratio output characteristic measurement (step SA1) subroutine is described with reference to a flowchart shown in FIG. 13.

First, at step SB1, the measurement condition determining module 21b reads the engine speed Ne1 detected by the engine speed sensor 57, the throttle opening Th1 detected by the throttle opening sensor 53, the air intake flow rate A1 detected by the airflow sensor 29, and the engine coolant temperature Tw1 detected by the engine coolant temperature sensor 23. Then, the routine proceeds to step SB2.

At the step SB2, the measurement condition determining module 21b determines whether the execution condition of the air fuel ratio sensor output characteristic measurement (i.e., the output characteristic measurement of the linear O₂ sensor 47) is satisfied. In more detail, the measurement condition determining module 21b determines whether the engine coolant temperature Tw1 is above a predetermined temperature which indicates the completion of engine warm-up, or whether each variation of the engine speed Ne1, the air intake filling efficiency, and the throttle opening Th1 is small and, thus these values are stable. If the determination at step SB2 is NO, the routine returns to step SB1 when the engine speed is in a low speed range like in idling, for example.

On the other hand, if the determination at step SB2 is YES (i.e., when it determines that the influence on the vehicle's traveling is small even if the air fuel ratio is varied), the routine proceeds to step SB3, where the fuel amount increase is started from the first cylinder #1. Then, the routine proceeds to step SB4. At step SB4, the measurement condition determining module 21b determines whether the fuel amount increase control is continued for [n (integer)×4 (the number of cylinders)] times (i.e., 4 times, 8 times, 12 times, etc.), in the order of the first cylinder #1, the third cylinder #3, the fourth cylinder #4, and the second cylinder #2. If the determination at step SB4 is NO, the routine returns to step SB3.

On the other hand, if the determination at step SB4 is YES, the routine proceeds to step SB5, where the fuel amount decrease is started from the first cylinder #1. Then, the routine proceeds to step SB6. At step SB6, the measurement condition determining module 21b determines whether the fuel amount decrease control is continued for [n (integer)×4 (the number of cylinders)] times, in the order of the first cylinder #1, the third cylinder #3, the fourth cylinder #4, and the second cylinder #2. If the determination at step SB6 is NO, the routine returns to step SB5, and, on the other hand, if the determination at step SB6 is YES, the routine proceeds to step SB7. As described above, when repeating the fuel amount increase and the fuel amount decrease by performing the fuel injection process for the integral multiple times of the total number of cylinders from the particular cylinder (e.g., the first cylinder #1), the measurement is started always from the same cylinder (e.g., the first cylinder #1) for both the increasing and the decreasing in fuel amount.

At step SB7, the output characteristic measuring module 21a executes the output characteristic measurement of the linear O₂ sensor 47 (i.e., measures the dead time and the response of the linear O₂ sensor 47 for the increase and the decrease in fuel amount in the air fuel ratio varying control. Then, the routine proceeds to step SB8.

At step SB8, the measurement condition determining module 21b determines whether the air fuel ratio output characteristic measurement is performed for the predetermined number of times. If the determination at step SB8 is NO, the routine returns to step SB1, and, if the determination at step SB8 is YES, the routine ends.

<<Output Value Correction Processing>>

Figure 14:
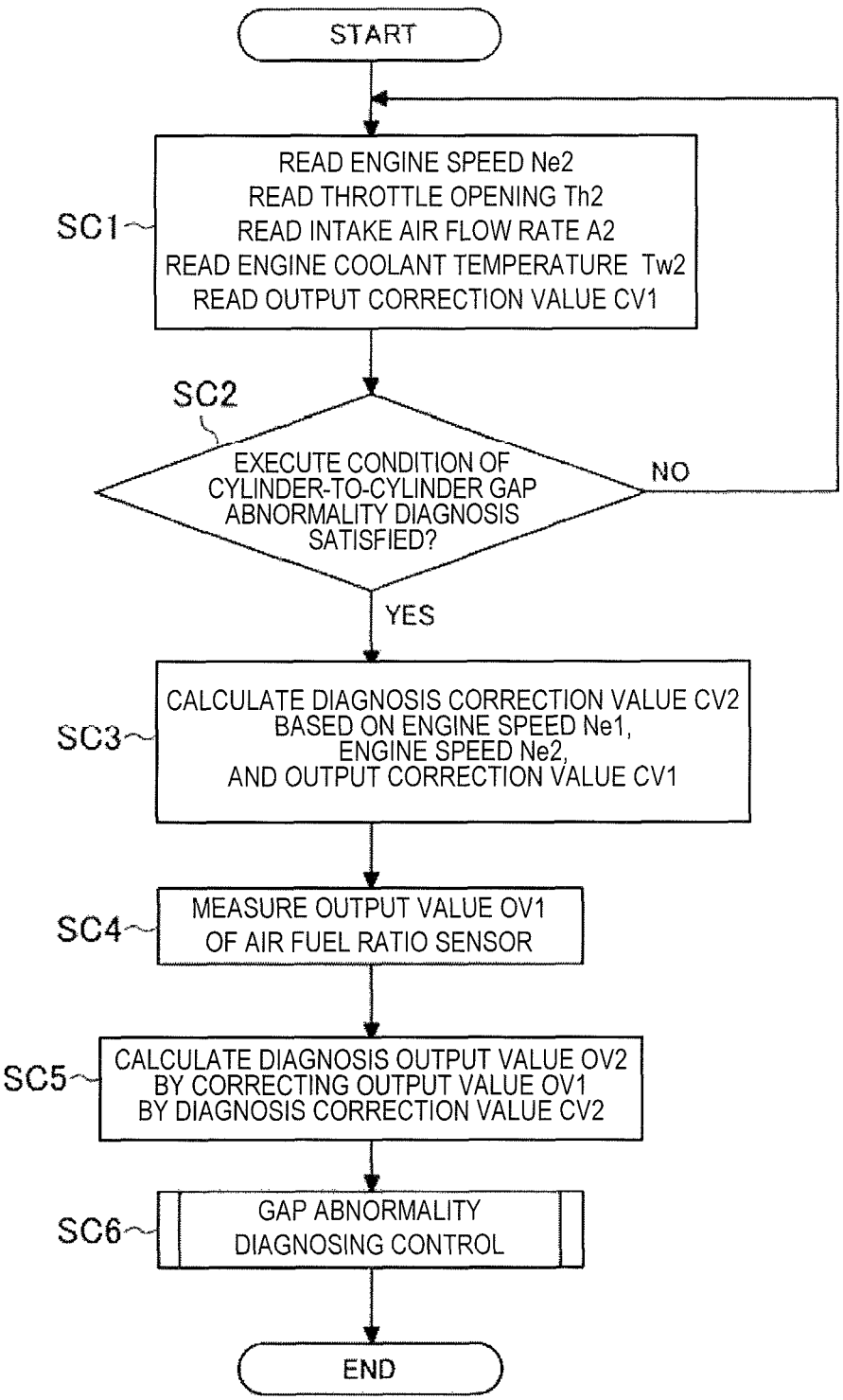
FIG. 14 is a flowchart showing a control of the PCM.

Next, output value correction processing is described with reference to a flowchart shown in FIG. 14.

First, at step SC1, the measurement condition determining module 21b reads the engine speed Ne2 detected by the engine speed sensor 57, the throttle opening Th2 detected by the throttle opening sensor 53, the intake air flow rate A2 detected by the airflow sensor 29, the engine coolant temperature Tw2 detected by the engine coolant temperature sensor 23, and the output correction value CV1 calculated by the correction value calculating module 21c. Then, the routine proceeds to step SC2.

At step SC2, the measurement condition determining module 21b determines whether an execute condition of the cylinder-to-cylinder gap abnormality diagnosis is satisfied. If the determination at step SC2 is NO (i.e., if the output correction value CV1 calculated by the correction value calculating module 21c is not read, or if the engine speed Ne2 is in a low speed range like, for example, in idling, the routine returns to step SC1.

On the other hand, if the determination at step SC2 is YES, the routine proceeds to step SC3, where the output value correcting module 21d calculates the diagnosis correction value CV2 based on the engine speed Ne1, the engine speed Ne2, and the output correction value CV1. Specifically, the output value correcting module 21d corrects the output correction value CV1 so that the output correction value CV1 is smaller as the engine speed Ne2 when correcting the output value of the linear O₂ sensor 47 decreases rather than the engine speed Ne1 when measuring the output characteristic of the linear O₂ sensor 47. On the other hand, the output value correcting module 21d corrects the output correction value CV1 so that the output correction value CV1 is larger as the engine speed Ne2 when correcting the output value OV1 of the linear O₂ sensor 47 increases rather than the engine speed Ne1 when measuring the output characteristic of the linear O₂ sensor 47. The output value correcting module 21d then calculates the diagnosis correction value CV2. Then, the routine proceeds to step SC4.

At step SC4, the output value correcting module 21d measures the output value OV1 of the linear O₂ sensor 47, and then, the routine proceeds to step SC5. At step SC5, the output value correcting module 21d corrects the output value OV1 of the linear O₂ sensor 47 measured at step SC4, by using the diagnosis correction value CV2 calculated at step SC3. Specifically, the diagnosis output value OV2 is calculated by multiplying the output value OV1 by the diagnosis correction value CV2. Then, the routine proceeds to step SC6.

At step SC6, after performing a gap abnormality diagnosing control described later, the routine ends.

<<Gap Abnormality Diagnosing Control>>

Figure 15:
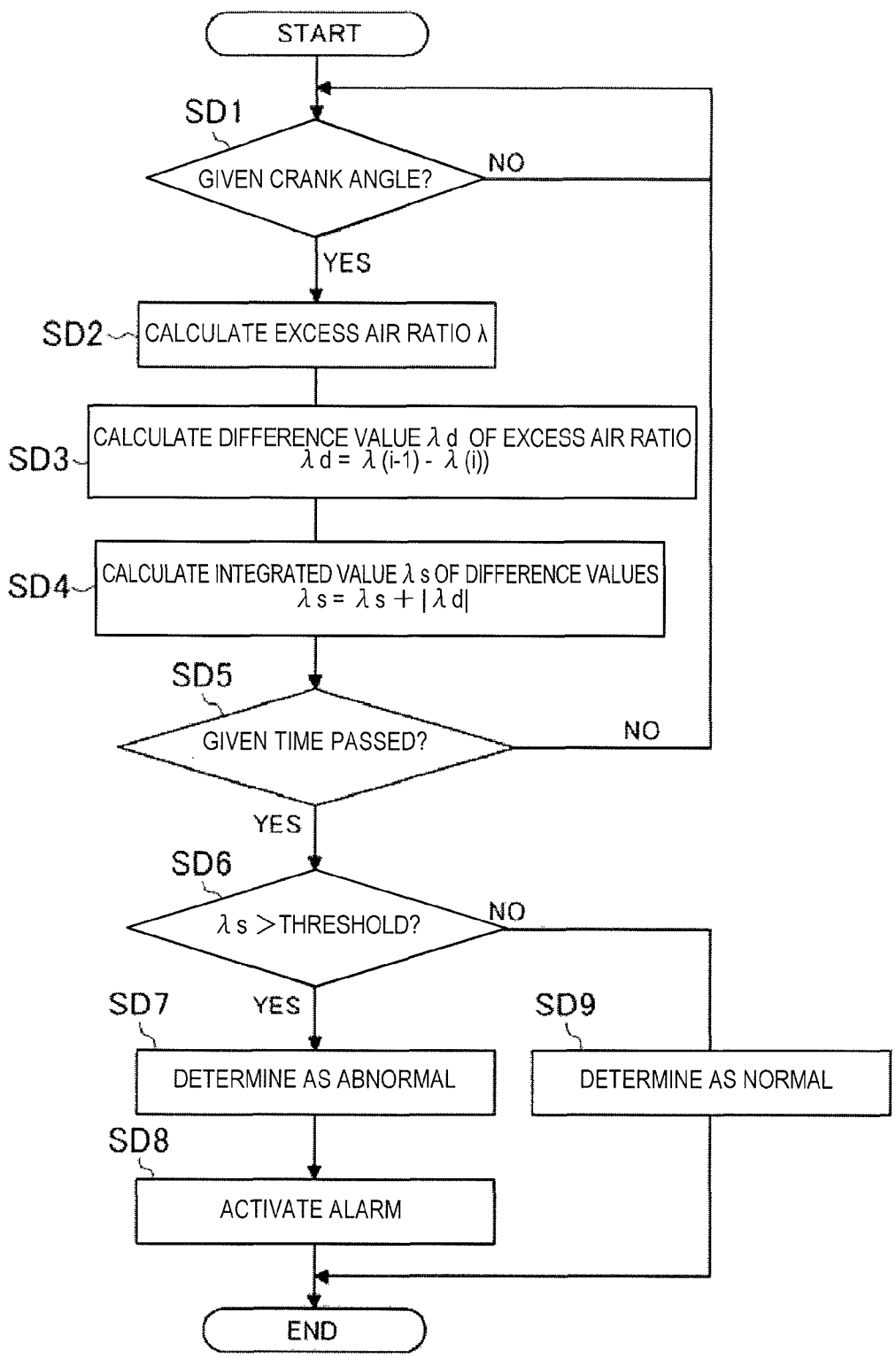
FIG. 15 is a flowchart illustrating a procedure of the control of a gap abnormality diagnosing control subroutine.

Next, a subroutine of the gap abnormality diagnosing control (step SC6) is described with reference to a flowchart shown in FIG. 15.

First, at step SD1, it is determined whether a current crank angle is a predetermined crank angle, from which a difference value λd of the excess air ratio λ is calculated, based on the signal from the crank angle sensor 37. If the determination at step SD1 is NO, the routine returns to step SD1. On the other hand, if the determination at step SD1 is YES, the routine proceeds to step SD2.

At step SD2, the excess air ratio λ (=diagnosis output value OV2/theoretical air fuel ratio) is calculated. Then, the routine proceeds to step SD3.

At step SD3, a previous excess air ratio λ (one time before) is set to λ(i−1), and a current excess air ratio λ is set to λ(i). Then, a difference value λd (=λ(i−1)−λ(i)) of the excess air ratio λ is calculated. Then, the routine proceeds to step SD4.

At step SD4, an absolute value |λd| of the difference value λd of the current excess air ratio λ calculated at step SD3 is added to an integrated value λs of the difference value of the previous excess air ratio λ stored in the PCM 21 to obtain the integrated value λs of the difference value of the current excess air ratio λ. Then, the routine proceeds to step SD5.

At step SD5, it is determined whether a time period, during which the absolute values |λd| of the difference values λd of the excess air ratio λ are integrated, has passed a given time period. If the determination at step SD5 is NO, the routine returns to step SD1 where the addition of the difference value to the integrated value λs is continued. On the other hand, if the determination at step SD5 is YES, the routine proceeds to step SD6.

At step SD6, it is determined whether the integrated value λs of the difference values of the excess air ratio λ is larger than a predetermined threshold. If the determination at step SD6 is NO, the routine proceeds to step SD9. After it is determined that it is normal, the routine ends. On the other hand, if the determination at step SD6 is YES, the routine proceeds to step SD7 where it is determined that the cylinder-to-cylinder gap abnormality of the air fuel ratio of the supplied air fuel mixture occurred. Then, the routine proceeds to step SD8.

At step SD8, by activating an alarm (blinking a warning lamp 59), an operator of the vehicle is informed of the occurrence of the cylinder-to-cylinder gap abnormality of the air fuel ratio of the supplied air fuel mixture. Then, the routine ends.

—Effects—

In this embodiment, when changing the fuel injection amount, because the increase or the decrease in the fuel injection amount is started from the particular cylinder (e.g., the first cylinder #1), the measurement errors resulting from that the cylinder from which the change in the fuel injection amount is started varies can be suppressed. Therefore, the output characteristic of the linear $O_2$ sensor 47 can be measured with sufficient accuracy regardless of the contacting strength of the emission gas for every cylinder against the linear $O_2$ sensor 47.

In addition, the given time period is a period during which the fuel injection process is performed by the integral multiple times of the total number of cylinders. Thus, because the measurement is always started from the first cylinder #1 in increasing the fuel amount as well as in decreasing the fuel amount, the measurement errors resulting from that the cylinder from which the change in the fuel injection amount is started varies can be suppressed.

Even when the appropriate output value is not outputted due to the individual specificity of the linear $O_2$ sensor 47, the detected output value OV1 of the linear $O_2$ sensor 47 is corrected based on the output correction value CV1 calculated under the predetermined condition (by the diagnosis correction value CV2), thereby the appropriate diagnosis output value OV2 of the linear $O_2$ sensor 47 can be obtained.

Embodiment 2

This embodiment uses a different control pattern of the fuel injection amount control from that of Embodiment 1. Hereinafter, the different point from Embodiment 1 is described.

Figure 16A:
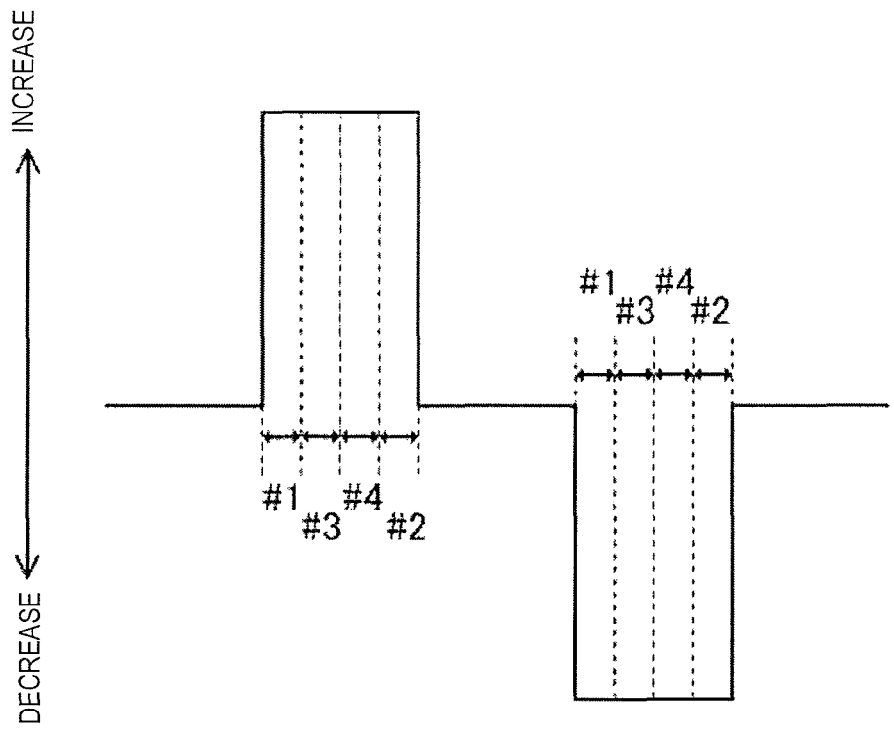
FIGS. 16A and 16B are diagrams schematically showing control patterns of a fuel injection amount control according to Embodiment 2.

In the previous Embodiment 1, immediately after the completion of the increases in the fuel injection amount for four cylinders, the fuel injection amount is then decreased. However, in this embodiment, as shown in FIG. 16A, the increases in the fuel injection amount for the fuel injection processes for four cylinders are completed and an area of the theoretical air fuel ratio is then given, and, after that, the decreases in the fuel injection amount for the fuel injection processes for four cylinders are carried out. Alternatively, as shown in FIG. 16B, the decrease in the fuel injection amount for the fuel injection processes for four cylinders are completed and the area of the theoretical air fuel ratio is then given, and, after that, the increase in the fuel injection amount for the fuel injection processes for four cylinders is carried out.

Figure 16B:
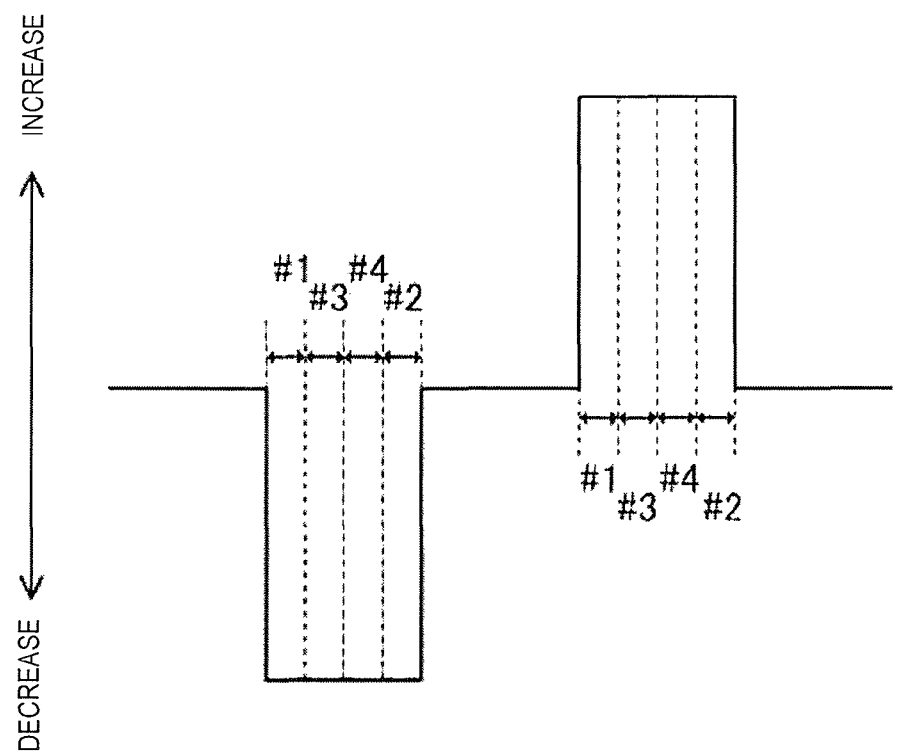

Note that "#1 to #4" in FIGS. 16A and 16B indicate the fuel injection processes of the first cylinder to the fourth cylinder, respectively, similar to FIGS. 6A and 6B. Further, in the example of FIGS. 16A and 16B, the increasing amount (or the decreasing amount) of the fuel injection amount in the fuel injection process is the same for every cylinder. However, the increasing amount (or the decreasing amount) of the fuel injection amount in the fuel injection process may be different for each cylinder, for example.

In this embodiment, the fuel injection amount control is performed under the first predetermined condition (i.e., in a state where the influence on the vehicle's traveling due to the change in the air fuel ratio is small). However, if the fuel injection amount is controlled in this way as described in the previous paragraph, the influence on the vehicle's traveling can be further suppressed.

Embodiment 3

This embodiment is different from Embodiments 1 and 2 in that the measurement of the output characteristic is started from the particular cylinder (e.g., the first cylinder #1) and the measurement of the output characteristic is started at an exhaust timing of the particular cylinder. Hereinafter, the different points from Embodiments 1 and 2 are described.

Figure 17:
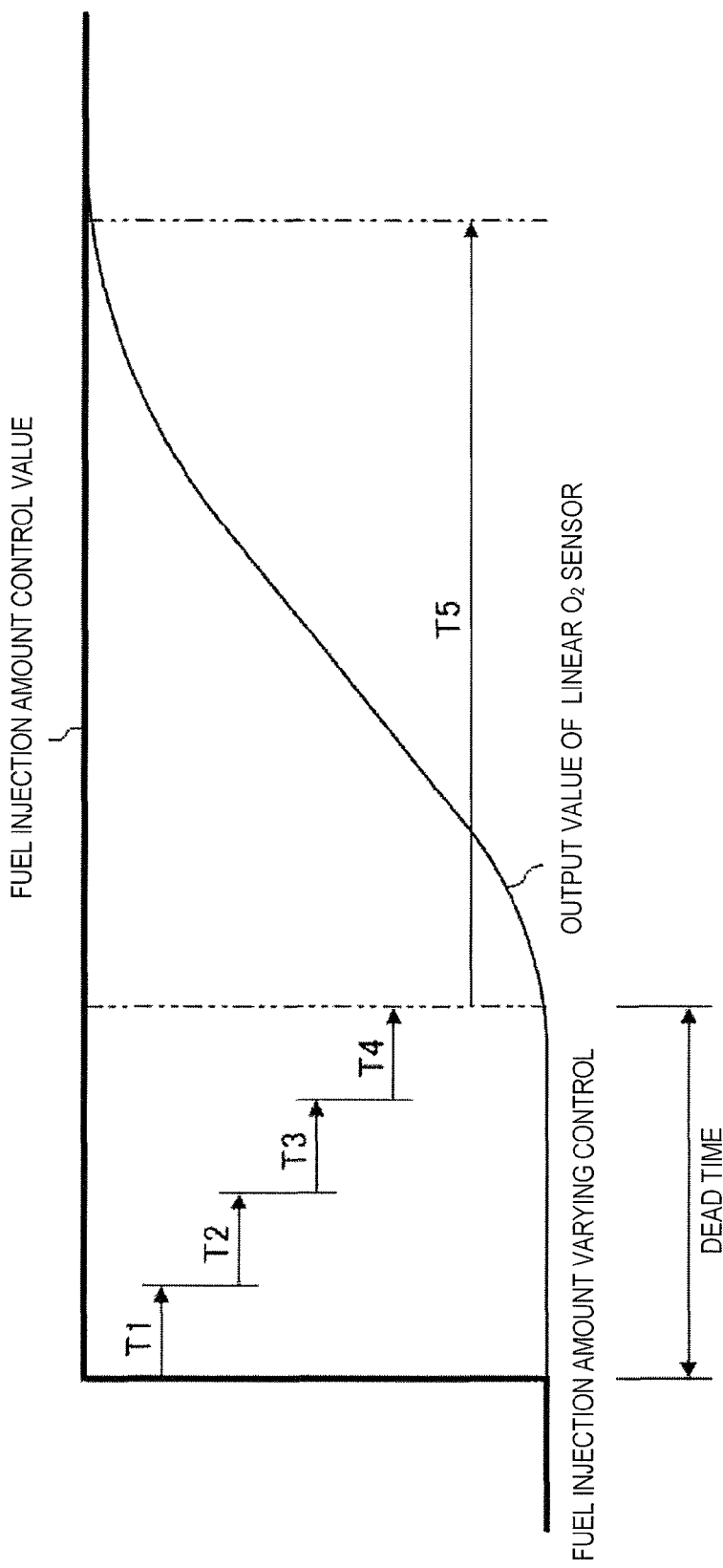
FIG. 17 is a graph schematically illustrating a mechanism where the dead time is generated and a mechanism where the response becomes small.

FIG. 17 is a graph schematically illustrating a mechanism in which the dead time is generated and a mechanism in which the response becomes smaller. As shown in FIG. 17, the dead time from the change of the fuel injection amount (the fuel injection amount varying control) until the detection of the change in the air fuel ratio of the exhaust gas by the linear $O_2$ sensor 47 is produced by accumulating a delay variation T1, a delay variation T2, a delay variation T3, and a delay variation T4. Here, T1 is a delay variation after transmitting a signal for the output characteristic measuring module 21a to actuate the injector 39 until the fuel injection amount is actually changed. T2 is a delay variation until the exhaust gas is discharged from the first cylinder #1 for which the fuel injection amount is changed. T3 is a delay variation until the exhaust gas fills the exhaust gas collecting part 95. T4 is a delay variation until the exhaust gas reaches the element of the linear $O_2$ sensor 47. Here, the response becomes smaller due to a reaction delay T5 of the element of the linear $O_2$ sensor 47.

Therefore, in order to eliminate at least the delay variation T1 and the delay variation T2, the PCM 21 starts the increase (or the decrease) in the fuel injection amount from the first cylinder #1 by the output characteristic measuring module 21a. Then, the increase (or the decrease) in the fuel injection amount is continued for the given time period, and, when measuring the output characteristic of the linear $O_2$ sensor 47, the PCM 21 starts the measurement of the output characteristic at the exhaust timing of the first cylinder #1. The term "exhaust timing" as used herein refers to an open timing of the exhaust valve 45, and, in this embodiment, the exhaust valve 45 is set to open by the electromagnetic VVT 45a at the beginning of exhaust stroke.

Figure 18:
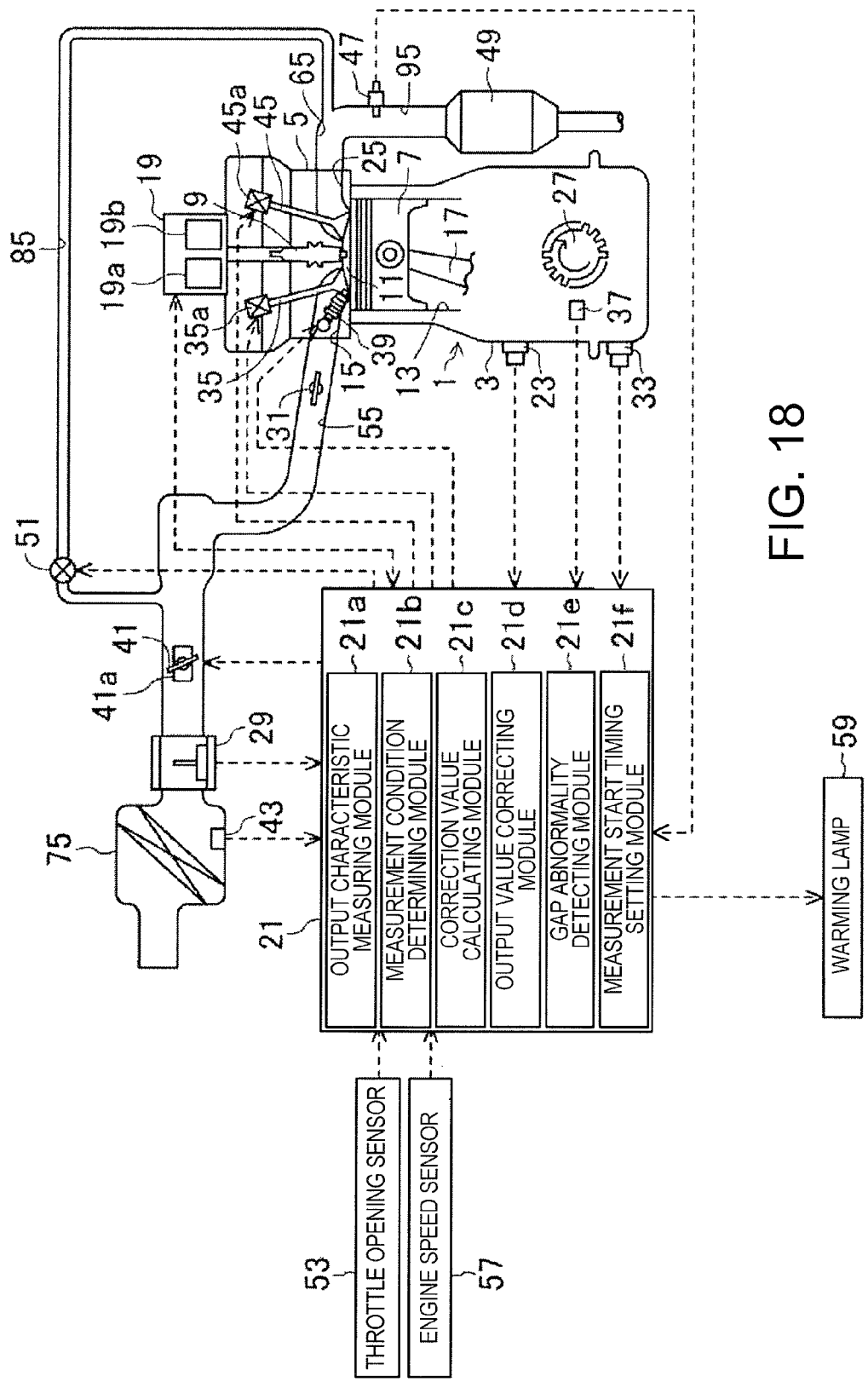
FIG. 18 is a schematic diagram showing a control system of the engine according to Embodiment 3.

Specifically, as shown in FIG. 18, the PCM 21 includes the output characteristic measuring module 21a, the measurement condition determining module 21b, the correction value calculating module 21c, the output value correcting module 21d, and the gap abnormality detecting module 21e. In addition, the PCM 21 includes a measurement start timing setting module 21f. The same components as those of Embodiment 1 (FIG. 1) are denoted with the same reference numerals.

When the output characteristic measuring module 21a starts the increase in the fuel injection amount, the measurement start timing setting module 21f reads the crank angle detected by the crank angle sensor 37, calculates the open timing of the exhaust valve 45 of the first cylinder #1 based on the crank angle, and sets the open timing of the exhaust valve 45 to the measurement start timing of the output characteristic. The measurement start timing set by the measurement start timing setting module 21f is inputted to the output characteristic measuring module 21a. The output characteristic measuring module 21a starts the measurement of the output characteristic of the linear $O_2$ sensor 47 from the start of the exhaust stroke of the first cylinder #1, according to the measurement start timing.

As described above, the measurement of the output characteristic is started according to the measurement start timing. In other words, the measurement of the output characteristic is started from the start of the exhaust stroke of the first cylinder #1, instead of the change timing of the fuel control shown in the section (a) of FIG. 19 or the fuel injection timing of the first cylinder #1 shown in the section (b) of FIG. 19. Therefore, as shown in the section (g) of FIG. 19, the dead time from the change timing of the fuel control to the start of the exhaust stroke (T1+T2) can be eliminated. The sections (c), (d) and (e) of FIG. 19 indicate the fuel injection timing of the third cylinder #3, the fourth cylinder #4, and the second cylinder #2, respectively, and each stroke.

Figure 19:
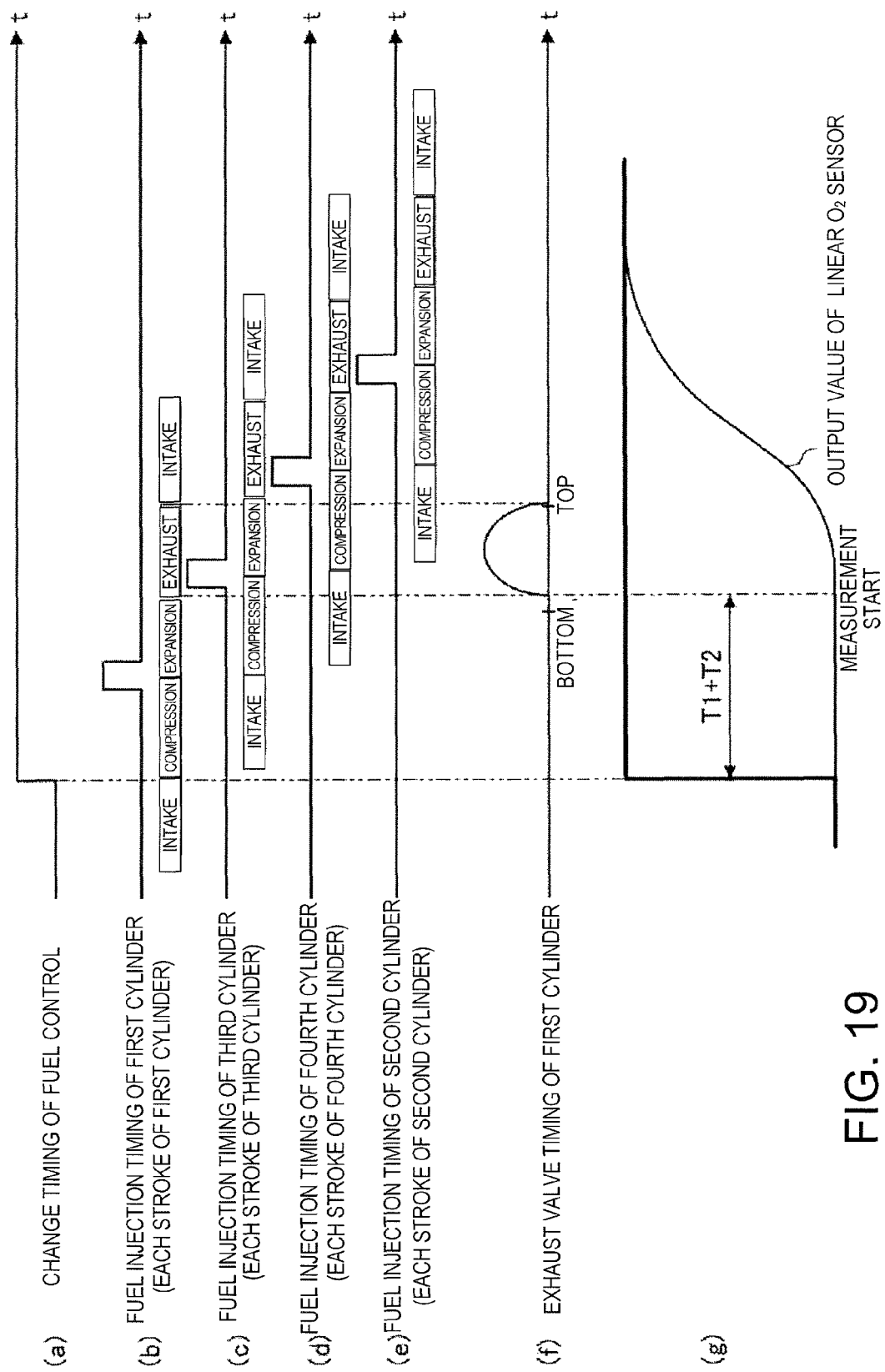
FIG. 19 is a chart schematically showing relations between strokes of each cylinder and a measurement start timing.

Further, in this embodiment, as shown in the section (f) of FIG. 19, the open-and-close timing of the exhaust valve 45 is set so that the exhaust valve 45 is opened on the way when the piston 7 goes up from bottom dead center (about 30°) and the exhaust valve 45 is closed immediately after the piston 7 descends from top dead center (about 5°). However, without limiting to this, the exhaust valve 45 may be opened before the piston 7 reaches bottom dead center, for example. In such a configuration, the output characteristic of the linear $O_2$ sensor 47 can be measured with sufficient accuracy, even during the exhaust stroke as well as when the exhaust gas is discharged in a time range from the terminal period of expansion stroke before the exhaust stroke.

Figure 20:
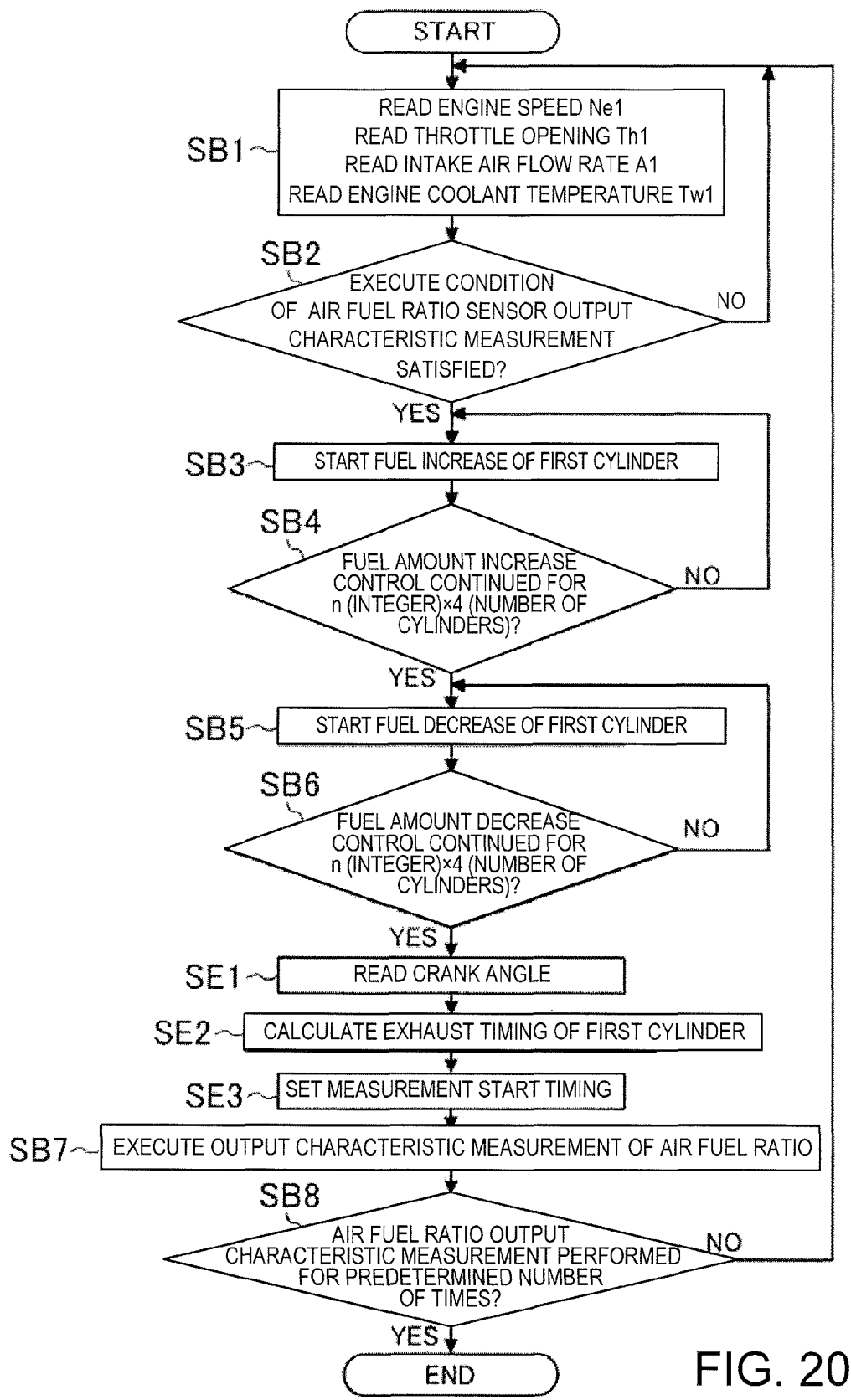
FIG. 20 is a flowchart illustrating a procedure of the control of an air fuel ratio varying control subroutine according to Embodiment 3.

Next, the air fuel ratio output characteristic measurement subroutine of this embodiment is described with reference to a flowchart shown in FIG. 20. Note that, because steps SB1 to SB6 and steps SB7 to SB8 are the same steps as those of the flowchart shown in FIG. 13, detailed description thereof is omitted.

At step SB3, the fuel amount increase is started from the first cylinder #1, and if the determination at step SB4 is YES, the fuel amount decrease of the first cylinder #1 is started at step SB5. Then, if the determination at step SB6 is YES, the measurement start timing setting module 21f reads the crank angle detected by the crank angle sensor 37 at step SE1. Then, the routine proceeds to step SE2.

At step SE2, the measurement start timing setting module 21f calculates the open timing of the exhaust valve 45 of the first cylinder #1 based on the crank angle. Then, the routine proceeds to step SE3. At step SE3, the measurement start timing setting module 21f sets the open timing of the exhaust valve 45 of the first cylinder #1 to the measurement start timing of the output characteristic. Then, the routine proceeds to step SB7. At step SB7, the output characteristic measuring module 21a performs the output characteristic measurement of the linear $O_2$ sensor 47 from the open timing of the exhaust valve 45 of the first cylinder #1.

—Effects—

In this embodiment, when changing the fuel injection amount, the measurement of the output characteristic is started from the first cylinder #1 at which the increase or the decrease in the fuel injection amount is always started, as well as the measurement of the output characteristic is started at the exhaust timing of the first cylinder #1. Therefore, at least, the delay variation T1 after transmitting the signal for the output characteristic measuring module 21a to actuate the injector 39 until the fuel injection amount is actually changed, and the delay variation T2 until the exhaust gas is discharged from the first cylinder #1 for which the fuel injection amount is changed can be eliminated. Thereby, the output characteristic of the linear $O_2$ sensor 47 can be measured with more accuracy.

OTHER EMBODIMENTS

The present invention is not limited to the above embodiments, but it may be implemented in other various forms without deviating from the spirit or the subject matters.

In the above embodiments, the linear $O_2$ sensor 47 for generating the output which is substantially proportional to the air fuel ratio is used as the air fuel ratio sensor. However, without limiting to this, the air fuel ratio sensor may be a lambda $O_2$ sensor which output changes suddenly bordering on, for example, $\lambda=1$, as long as the correction value is not calculated.

Further, in the above embodiments, in order to determine the gap abnormality of the air fuel ratio of any of the cylinders, the output characteristic of the air fuel ratio is measured by the output characteristic measuring method described in the claims. However, this output characteristic measuring method may be used for other applications, such as a failure detection of the air fuel ratio sensor.

Further, in the above embodiments, the correction value is corrected based on the speed at the time of correcting the output value of the linear $O_2$ sensor 47. However, without limiting to this, the correction value may be corrected based on the exhaust flow rate at the time of correcting the output of the linear $O_2$ sensor 47.

Further, in the above embodiments, the abnormality of the air fuel ratio of any of the cylinders is determined by whether the integrated value of the difference values of the excess air ratio $\lambda$ within the given time period is above the predetermined value. However, without limiting to this, any other determination techniques may also be used.

Further, in the above embodiments, the reference characteristic (the reference dead time and the reference response) is set to the median of the product variation of the linear $O_2$ sensor 47. However, without limiting to this, it may be a design criteria value of the linear $O_2$ sensor 47.

Further, in the above embodiments, the output value OV1 of the linear $O_2$ sensor 47 is corrected by multiplying it by the diagnosis correction value CV2. However, without limiting to this, the output value OV1 may be corrected by adding or subtracting the diagnosis correction value CV2.

As described above, the above embodiments are merely illustrations in all aspects and, therefore, it must not be interpreted in a limited way. In addition, all of modifications and changes falling under the equivalent range of the claims are within the scope of the present invention.

As described above, the present invention is useful for a method and device for measuring the output characteristic of the air fuel ratio detecting module based on the output value of the air fuel ratio detecting module at the time of changing the fuel injection amount.

The invention claimed is:

1. A method for use in air fuel ratio measurement, comprising:
   measuring an output characteristic of an air fuel ratio detecting module that is provided to an exhaust gas collecting part of an engine and outputs a value related to an oxygen concentration in an exhaust gas flowing in the exhaust gas collecting part, the measuring being based on an output value of the air fuel ratio detecting module at a time of changing a fuel injection amount, wherein the changing of the fuel injection amount during which the measuring of the output characteristic occurs is accomplished by:
      performing at least one of the following under a predetermined condition:
         starting an increase in the fuel injection amount at a particular cylinder, and continuing the increase in the fuel injection amount for a given time period; and
         starting a decrease in the fuel injection amount at the particular cylinder, and continuing the decrease in the fuel injection amount for the given time period;
   calculating a correction value for correcting the output value of the air fuel ratio detecting module based on the output characteristic of the air fuel ratio detecting module;
   correcting the output value of the air fuel ratio detecting module based on the correction value; and
   detecting a cylinder-to-cylinder gap abnormality of an air fuel ratio of supplied air fuel mixture based on the corrected output value of the air fuel ratio detecting module.

2. The method of claim 1, wherein, when measuring the output characteristic of the air fuel ratio detecting module, the measurement of the output characteristic is started at an exhaust timing of the particular cylinder.

3. The method of claim 2, wherein the exhaust timing is an open timing of an exhaust valve.

4. The method of claim 1, wherein the given time period is a time period during which a fuel injection process is performed for an integral multiple times of a total number of cylinders.

5. The method of claim 1, wherein the correction value is calculated based on a difference between a median of a variation in the output characteristic of the air fuel ratio detecting module caused by a mechanical individual specificity of the air fuel ratio detecting module, which is set in advance, and the measured output characteristic.

6. The method of claim 1, wherein the output characteristic is related to a dead time, which is a time it takes to detect the change in an air fuel ratio of the exhaust gas by the air fuel ratio detecting module after the air fuel ratio of the air fuel mixture is changed, and a response, which is a rate of change in the air fuel ratio detected after the air fuel ratio detecting module detects the change in the air fuel ratio of the exhaust gas.

7. A method for use in air fuel ratio measurement, comprising:
   measuring an output characteristic of an air fuel ratio detecting module that is provided to an exhaust gas collecting part of an engine and outputs a value related to an oxygen concentration in an exhaust gas flowing in the exhaust gas collecting part, the measuring being based on an output value of the air fuel ratio detecting module at a time of changing a fuel injection amount, wherein the changing of the fuel injection amount during which the measuring of the output characteristic occurs is accomplished by:
      performing at least one of the following under a predetermined condition:
         starting an increase in the fuel injection amount at a particular cylinder, and continuing the increase in the fuel injection amount for a given time period; and
         starting a decrease in the fuel injection amount at the particular cylinder, and continuing the decrease in the fuel injection amount for the given time period; and
   calculating a correction value for correcting the output value of the air fuel ratio detecting module based on the output characteristic of the air fuel ratio detecting module, wherein the correction value is calculated based on a difference between a median of a variation in the output characteristic of the air fuel ratio detecting module caused by a mechanical individual specificity of the air fuel ratio detecting module, which is set in advance, and the measured output characteristic.

8. The method of claim 7, wherein, when measuring the output characteristic of the air fuel ratio detecting module, the measurement of the output characteristic is started at an exhaust timing of the particular cylinder.

9. The method of claim 8, wherein the exhaust timing is an open timing of an exhaust valve.

10. The method of claim 7, wherein the given time period is a time period during which a fuel injection process is performed for an integral multiple times of a total number of cylinders.

11. The method of claim 7, further comprising:
    correcting the output value of the air fuel ratio detecting module based on the correction value; and
    detecting a cylinder-to-cylinder gap abnormality of an air fuel ratio of supplied air fuel mixture based on the corrected output value of the air fuel ratio detecting module.

12. The method of claim 7, wherein the output characteristic is related to a dead time, which is a time it takes to detect the change in an air fuel ratio of the exhaust gas by the air fuel ratio detecting module after the air fuel ratio of the air fuel mixture is changed, and a response, which is a rate of change in the air fuel ratio detected after the air fuel ratio detecting module detects the change in the air fuel ratio of the exhaust gas.

* * * * *